United States Patent
Malik

(10) Patent No.: US 10,306,782 B2
(45) Date of Patent: *May 28, 2019

(54) MODULAR DEPLOYABLE DISPLAY UNIT AND SYSTEM THEREOF

(71) Applicant: Mansoor Malik, Dubai (AE)

(72) Inventor: Mansoor Malik, Dubai (AE)

(*) Notice: Subject to any disclaimer, the term of this patent is extended or adjusted under 35 U.S.C. 154(b) by 109 days.

This patent is subject to a terminal disclaimer.

(21) Appl. No.: 15/724,036

(22) Filed: Oct. 3, 2017

(65) Prior Publication Data

US 2018/0049330 A1 Feb. 15, 2018

Related U.S. Application Data

(63) Continuation-in-part of application No. 15/090,436, filed on Apr. 4, 2016, now Pat. No. 9,860,998, and a
(Continued)

(51) Int. Cl.
*H05K 5/00* (2006.01)
*G06F 1/16* (2006.01)
*G09G 3/32* (2016.01)

(52) U.S. Cl.
CPC ............ *H05K 5/0017* (2013.01); *G06F 1/16* (2013.01); *G09G 3/32* (2013.01); *G09G 2300/04* (2013.01); *G09G 2380/02* (2013.01)

(58) Field of Classification Search
CPC ........ G06F 1/1652; G06F 3/0412; G06F 3/14; G06F 1/1601; G06F 1/1615;
(Continued)

(56) References Cited

U.S. PATENT DOCUMENTS 1,430,394 A * 9/1922 McGee ............... G09F 11/295
200/DIG. 11
5,900,850 A 5/1999 Bailey et al.
(Continued)

FOREIGN PATENT DOCUMENTS

EP 2549463 A1 1/2013
WO 2007/035992 A1 4/2007

OTHER PUBLICATIONS

International Search Report and Written Opinion, International Application No. PCT/IB2017/051910, dated Apr. 6, 2018, 7 pages.

*Primary Examiner* — Dimary Lopez Cruz
*Assistant Examiner* — Ingrid Wright
(74) *Attorney, Agent, or Firm* — Fitch, Even, Tabin & Flannery LLP

(57) ABSTRACT

This invention covers a display system which includes modular deployable display units, a stand, a power source, a data input device and a display support. Each unit includes a housing, a spool assembly, a flexible electronic display member, an electrical cable and a connecting system for connecting the units to the stand and for physically connecting the units to one another, in an end to end arrangement. The assembly is mounted within the housing and includes a spool having opposite ends, to which the spool is rotatably mounted. The flexible member includes LEDs for displaying a programmable message. The flexible member has an end coupled to the spool and is displaceable between a wound configuration where the member is wound onto the spool and an unwound configuration where the member is unwound from the spool. A free end of the member is coupled to the support for displaying the message.

20 Claims, 22 Drawing Sheets

Related U.S. Application Data continuation of application No. PCT/IB2017/051910, filed on Apr. 4, 2017, which is a continuation-in-part of application No. 15/090,436, filed on Apr. 4, 2016, now Pat. No. 9,860,998.

(58) Field of Classification Search
CPC .... G06F 1/1626; G06F 1/1641; G06F 1/1684; G06F 1/16; G09G 2340/02; G09G 2380/02; G09G 2300/04; G09G 3/32; H05K 7/14; H05K 1/028; H05K 5/0017
See application file for complete search history.

(56) References Cited

U.S. PATENT DOCUMENTS

| | | |
|---|---|---|
| 7,821,479 B2 | 10/2010 | Zhang |
| 2011/0181494 A1 | 7/2011 | Wong et al. |
| 2013/0271940 A1* | 10/2013 | Cope ........................ H05K 7/14 361/809 |
| 2014/0268532 A1* | 9/2014 | Nicol ........................ G09F 9/301 361/679.26 |
| 2014/0362512 A1 | 12/2014 | Hinson |

\* cited by examiner

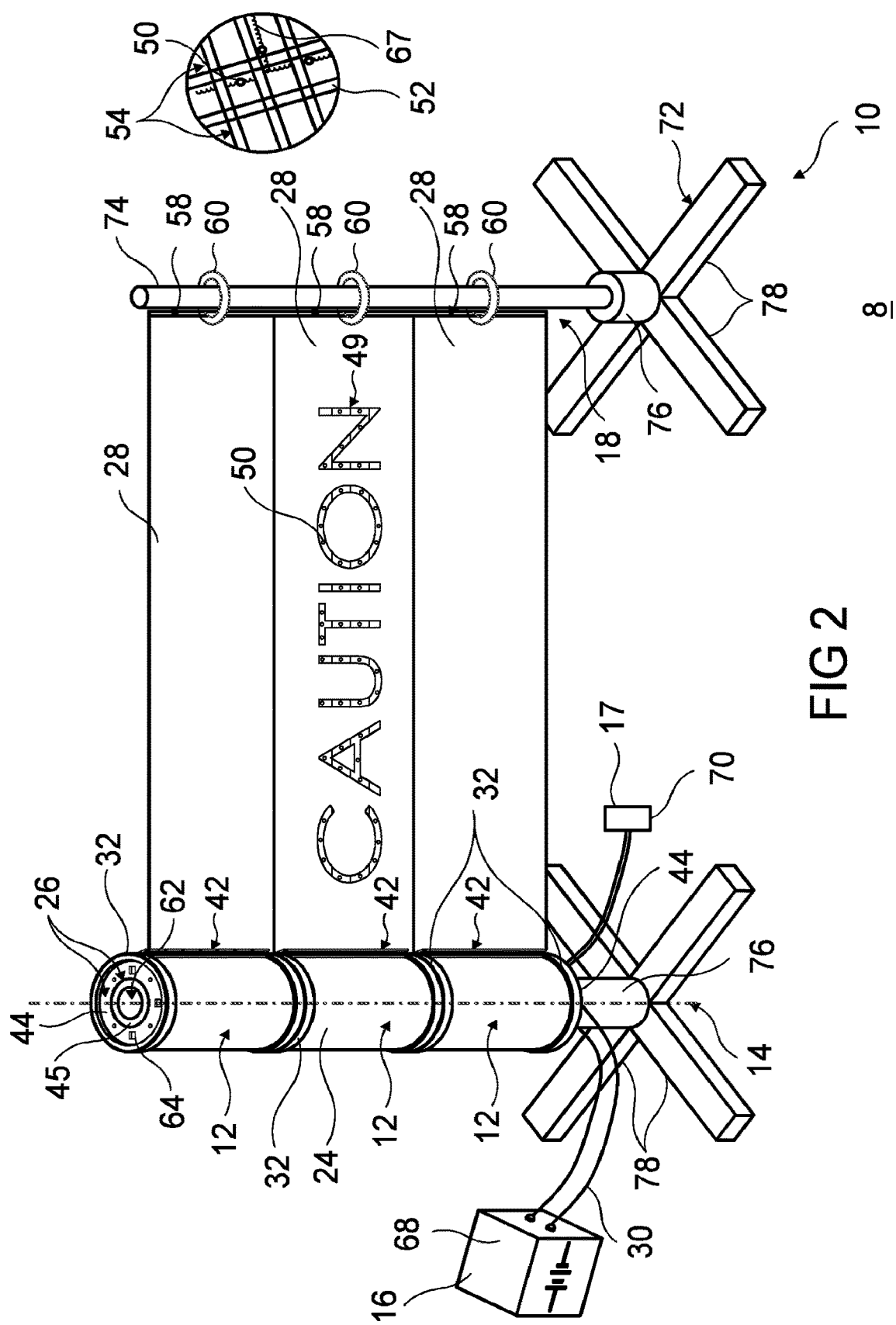

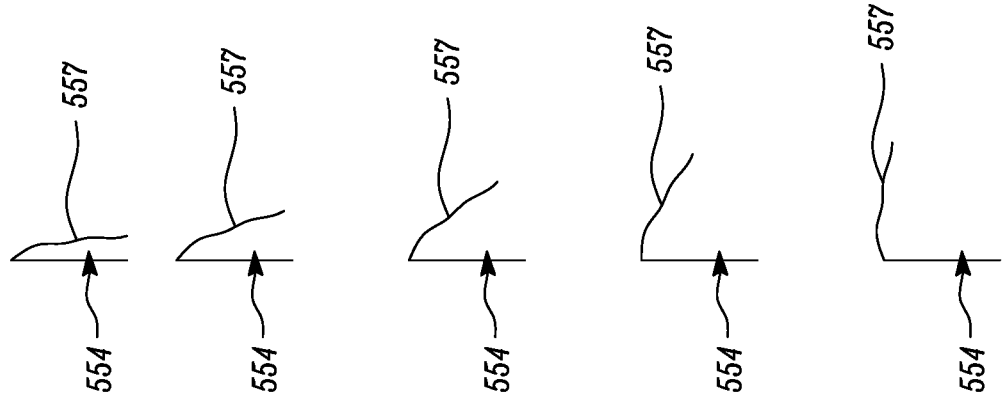

MODULAR DEPLOYABLE DISPLAY UNIT AND SYSTEM THEREOF

CROSS REFERNCE TO RELATED APPLICATIONS

This application is a continuation-in-part application of U.S. application Ser. No. 15/090,436, filed on Apr. 4, 2016, which is incorporated herein by reference in its entirety. This application is also a continuation of International Patent Application No. PCT/IB2017/051910, filed Apr. 4, 2017, which is a continuation-in-part of U.S. application Ser. No. 15/090,436, filed on Apr. 4, 2016, both of which are incorporated herein by reference in their entireties.

FIELD OF INVENTION

This invention relates to display units and more specifically, to a modular deployable display unit and system thereof.

BACKGROUND

Various types of portable display apparatus are known in the art. For example, EP 2 549 463 describes a retractable flexible display apparatus; however, such apparatus is not ideal for use in all situations as it is relatively cumbersome to transport and deploy and contains pre-printed messages which are not useful in all circumstances. US2011/0181494 discloses a retractable flexible display apparatus which comprise a plurality Light Emitting Diode (LED) display modules comprising a flexible substrate for supporting the LED's. Due to the overall configuration of the modules, the modules are not suitable for forming a large display, if so desired, nor are the modules easily transported and deployed. U.S. Pat. No. 7,821,479 discloses a rolling LED screen including a plurality of rigid supporting strips of equal lengths and a plurality of pixel units which are disposed at regular intervals along the rigid support strips. This rolling LED screen is cumbersome to transport and heavy to carry and handle due to the plurality of rigid supporting strips. U.S. Pat. No. 5,900,850 discloses a large scale, portable LED image display system comprising one or more panels comprising a netlike structure and LED's mounted on the netlike structure at regular intervals, for forming a matrix for projecting multi-coloured images. The LED display system is not easy to transport nor is it quick to deploy.

A need exists for a versatile portable display apparatus which overcomes the disadvantages of the display apparatus described above. A need also exists for a versatile portable display apparatus which can be easily transported and easily and quickly deployed in a variety of different circumstances. A need further exists for a portable display apparatus or system which can be used to form screens of desired sizes, depending on the requirements.

SUMMARY OF INVENTION

The invention has several aspects. According to a first aspect of the invention there is provided a modular deployable display unit including: a flexible electronic display member which is configured to display a programmable message, the flexible electronic display member being displaceable between: a deployed configuration wherein the flexible electronic display member extends outwardly for displaying the programmable message; and a stowed configuration wherein the flexible electronic display member takes up a relatively compact configuration; at least one electrical cable for supplying electrical energy to the flexible electronic display member; and connecting means for releasably connecting the modular deployable display unit to an additional modular deployable display unit, in an end to end arrangement.

The additional modular deployable display unit may be identical to the modular deployable display unit as described and defined in accordance with the first aspect of the invention.

In a particular embodiment, the modular deployable display unit may include a housing for stowing the flexible electronic display member when the flexible electronic display member is in the stowed configuration. As such, the connecting means may include connecting formations formed on the housing.

The housing may be displaceable between a stowage configuration wherein the housing houses the flexible electronic display member when the flexible electronic display member is in the stowed configuration; and a deployed configuration wherein the housing permits the flexible electronic display member to extend outside the housing for displaying the programmable message when the flexible electronic display member is in the deployed configuration. The housing may have an elongate configuration and may have a pair of opposite ends and a longitudinal axis extending between the ends. The housing may include a shell defining a hollow internal chamber located within the shell. The hollow internal chamber may have an opening leading out of the shell.

In a particular embodiment, the modular deployable display unit may include a spool having a pair of opposite ends and a longitudinal axis extending between the ends, the spool defining an axis of rotation about which the spool is rotatable, the flexible electronic display member being releasably coupled to the spool, the spool being displaceable between: a wound configuration wherein the flexible electronic display member is wound onto the spool for displacing the flexible electronic display member into the stowed configuration; and an unwound configuration wherein the flexible electronic display member is unwound from the spool for displacing the flexible electronic display member into the deployed configuration.

The spool may be rotatably mounted within the internal chamber of the housing in an arrangement wherein the axis of rotation of the spool is parallel to the longitudinal axis of the housing. More particularly, the spool may be rotatable mounted within the internal chamber of the housing in an arrangement wherein the flexible electronic display member is located within the internal chamber of the housing when the flexible electronic display member is in the wound configuration. More specifically, when the flexible electronic display member is in the unwound configuration, the flexible electronic display member at least partially extends from the opening in the shell.

More particularly, the connecting means may be configured to connect a particular one of the ends of the spool to an end of a spool of the additional modular deployable display unit. The connecting means may further include means for releasably connecting the modular deployable display unit to a base support structure for supporting the display unit on a substrate surface. More particularly, the connecting means may provide for releasably connecting a particular one of the ends of the spool to the base support structure. The connecting means may further include complementary connecting formations defined on the ends of the spool. More particularly, the complementary connecting formations may define complementary male and female parts which interconnect to one another.

The connecting means may further include electrical connecting means for electrically connecting the modular deployable display unit and the additional modular deployable display unit, in electrical contact with one another. More particularly, the electrical connecting means may be configured for electrically connecting the spool of the deployable display unit and the base support structure, to one another.

The flexible electronic display member may include a plurality of light emitting diodes (LEDs) for displaying the programmable message. The flexible electronic display member may include a flexible support member for supporting the plurality of LEDs thereon. The flexible support member may have a plurality of openings permitting passage of wind therethrough when the flexible electronic display member is in the unwound configuration. The flexible support member may have a net-like configuration. The flexible support member may have one of a knitted and a woven configuration. The flexible support member may be of a light reflective material so as to enhance the visibility of the flexible electronic display member. The flexible support member may be of brightly coloured material. The flexible electronic display member may have a fixed end which is wound onto the spool, in use, and an opposite free end. The flexible electronic display member may have mounting formations disposed at or near the free end thereof, for mounting the flexible electronic display member to a fixed support structure.

In a particular embodiment, the flexible electronic display member may include one or more inflatable bodies which are inflated, in use, for displacing the flexible electronic display member into the deployed configuration. The flexible electronic display member may define a plurality of apertures defined therethrough for permitting the passage of air through the plurality of apertures, in use. As such, the flexible electronic display member may include a plurality of flap members each associated with a particular one or more of the apertures and each arranged to cover the associated one or more of the apertures.

According to a second aspect of the invention there is provide a display system including: two or more modular deployable display units, each modular deployable display unit being a modular deployable display unit, as described and defined hereinabove, in accordance with the first aspect of the invention.

The display system may further include a base support structure which is connectable to at least one of said two or more modular deployable display units, the base support structure being locatable upon a substrate surface for supporting the display unit on the substrate surface.

The display system may include a power source for supplying electrical power to the flexible electronic display members of the deployable display units. The power source may be connectable to one of the base support structure and a particular one of the deployable display unit, in an arrangement wherein the power source supplies electrical power to the flexible electronic display members of each of said two or more modular deployable display units.

The display system may include a data input device for inputting said programmable message. The data input device may be in data communication with the flexible electronic display members of said one or more modular deployable display units.

The display system may include a fixed support structure for supporting the flexible electronic display member, when the flexible electronic display member is in the unwound configuration. More specifically, the fixed support structure may be configured for supporting the free end of the flexible electronic display member in an arrangement wherein the flexible electronic display member extends between the spool and the fixed support structure, for displaying the programmable message, in use. The fixed support structure may include a base formation and an elongate support member which is mounted to the base formation in an arrangement wherein the elongate support member projects upwardly from the base formation. The base formation may include a support body to which the elongate support member is mounted and a number of support legs mounted to the support body for supporting the support body. In a particular embodiment, the support legs of the fixed support structure may be displaceably mounted to the support body so as to be displaceable between a deployed position wherein the support legs are placed into contact with the substrate surface for stabilising the support body; and a stowed position wherein the support legs fold inwardly towards the support body so as to assume a compact configuration to facilitate stowage of the fixed support structure. More specifically, in a particular embodiment, the base formation may have an annular configuration in top view and the support legs may have a triangular shape. As such, each triangularly shaped support legs may have a proximal side displaceably mounted to the base formation and two unattached sides which are free. More specifically, each triangularly shaped support leg may be dimensioned so that when the support legs are displaced into the stowed position, the unattached sides of the support leg are disposed adjacent to one another and in contact with one another, such that the support legs and the base formation assume a cone shape.

In a particular embodiment, the elongate support member may be telescopically extendible to facilitate stowage of the elongate support member, in use.

BRIEF DESCRIPTION OF DRAWINGS

Further features of the invention are described hereinafter by way of a non-limiting example of the invention, with reference to and as illustrated in the accompanying diagrammatic drawings. In the drawings:

FIG. 2 shows a perspective view of a display system, in accordance with the invention, the display system including three modular deployable display units of FIG. 1B;

FIG. 9F shows a schematic view of parts of the display system of FIG. 9A, shown in use, in windy conditions of increasing strength.

DETAILED DESCRIPTION

Figure 3:
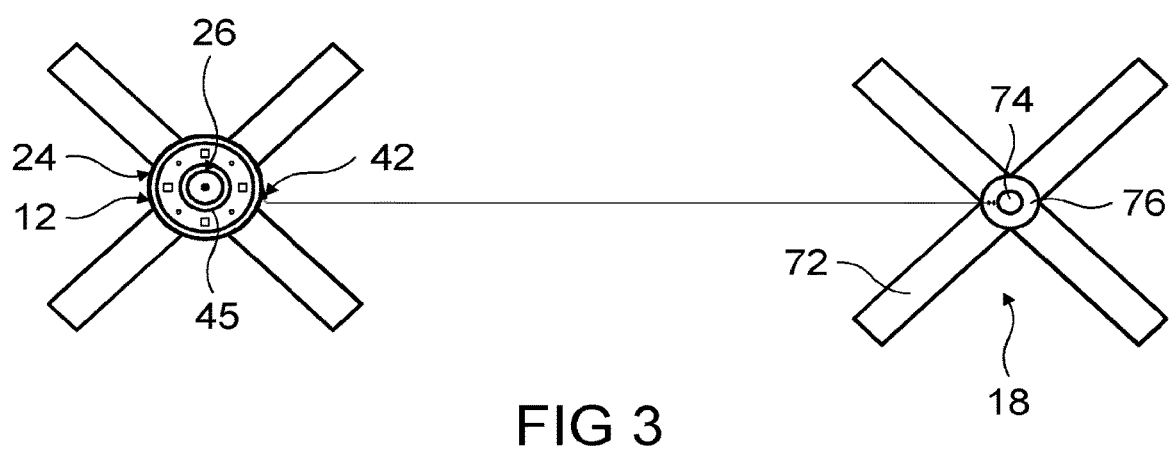
FIG. 3 shows a top view of the display system of FIG. 2.

With reference to FIGS. 1 to 3, a display system in accordance with the invention, in the form of a road traffic display system, is indicated generally by the reference numeral 10 (see FIG. 2). The road traffic display system 10 is adapted for use for displaying a message at the site of a traffic accident. The system 10 includes three modular deployable display units 12, a base support structure in the form of a stand 14, a power source 16, a data input device 17, and a fixed support structure in the form of a display support 18.

Each modular deployable display units 12 includes a housing 24, a spool assembly 26, a flexible electronic display member 28, an electrical cable 30 and a connecting system 32.

The housing 24 of each unit 12 has an elongate configuration and defines a pair of opposite ends and a longitudinal axis 36 extending between the ends. The housing 24 includes a shell 38. The shell 38 defines a hollow internal chamber (not shown) located within the shell 38. The shell 38 has an opening 42 leading out of the hollow internal chamber defined by the shell 38.

Figure 1A:
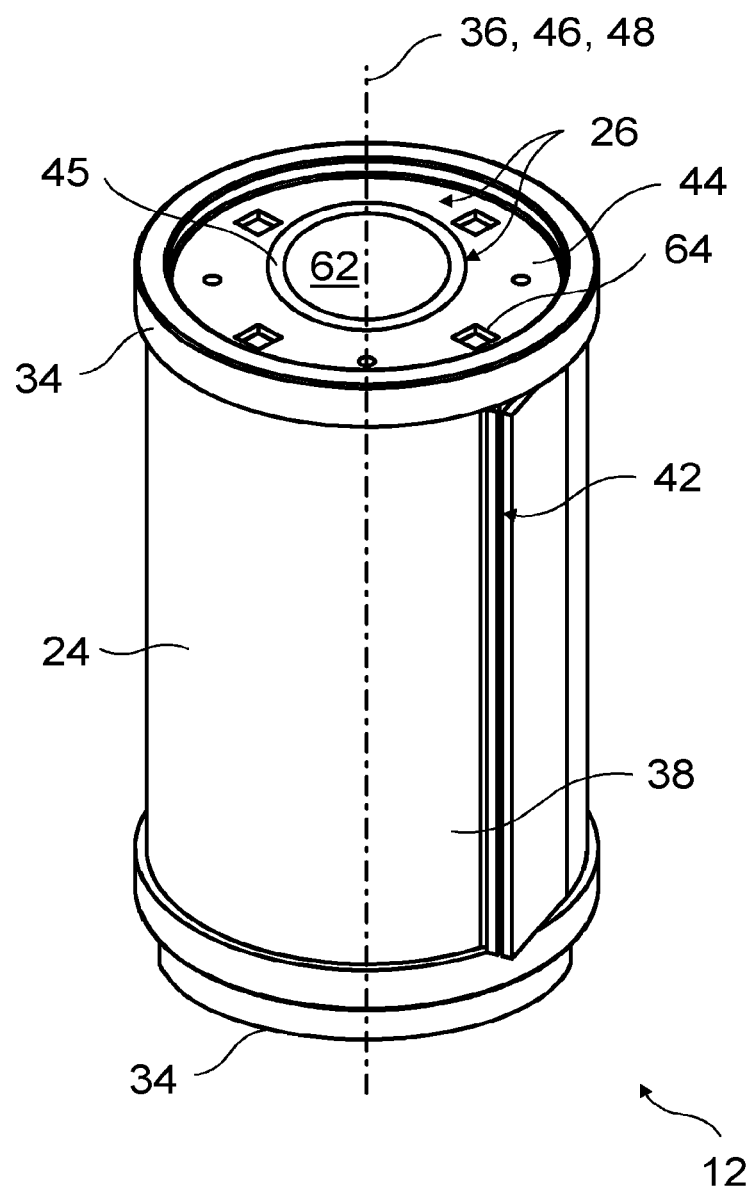
FIG. 1A shows a perspective view of a modular deployable display unit, in accordance with the invention, illustrated with a flexible electronic display member of the display unit in a wound configuration.

The spool assembly 26 includes a spool 45 having a pair of opposite ends 44, the spool 45 being rotatably mounted to the ends 44 and defining a longitudinal axis 46 extending between the ends 44, the spool 45 defining an axis 48 of rotation about which the spool 45 is rotatable. The spool 45 is rotatably mounted within the internal chamber of the housing 24 in an arrangement wherein the axis 48 of rotation of the spool 45 is parallel to the longitudinal axis 36 of the housing 24. More specifically, the axis 48 of rotation of the spool 45 is co-axially aligned with the longitudinal axis 36 of the housing 24, as best illustrated in FIG. 1A.

The flexible electronic display member 28 is configured to display a programmable message 49, as will be explained in more detail hereinbelow. With reference to the magnified view in FIG. 2, the flexible electronic display member 28 includes a plurality of lamps in the form of light emitting diodes (LEDs) 50 for displaying the programmable message 49 and a flexible support member 52 for supporting the plurality of LEDs 50 thereon. In other embodiments (not shown), the lamps may be of any other type of light emitting lamps or elements, such as, for example, incandescent lighting. The number of LEDs 50 may vary and will be selected so as to be sufficient to display a message of a desired size and resolution.

The flexible support member 52 is of a brightly coloured light reflective material, so as to enhance the visibility of the flexible electronic display member 28. As shown in the magnified view in FIG. 2, the flexible support member 52 has a plurality of openings 54 extending therethrough, the purpose of which will be explained in more detail hereinbelow. More specifically, as shown in the magnified view of FIG. 2, the flexible support member 52 has a net-like configuration. More specifically, the flexible support member 52 has a knitted or a woven configuration. In other embodiments (not shown), the flexible support member may be made of other material, such as, for example, water repellant or water resistant material. The flexible support member may be of a desired size. Furthermore, a size of openings (comparable to openings 54) may vary according to the intended use and factors such as prevailing wind conditions.

Figure 1B:
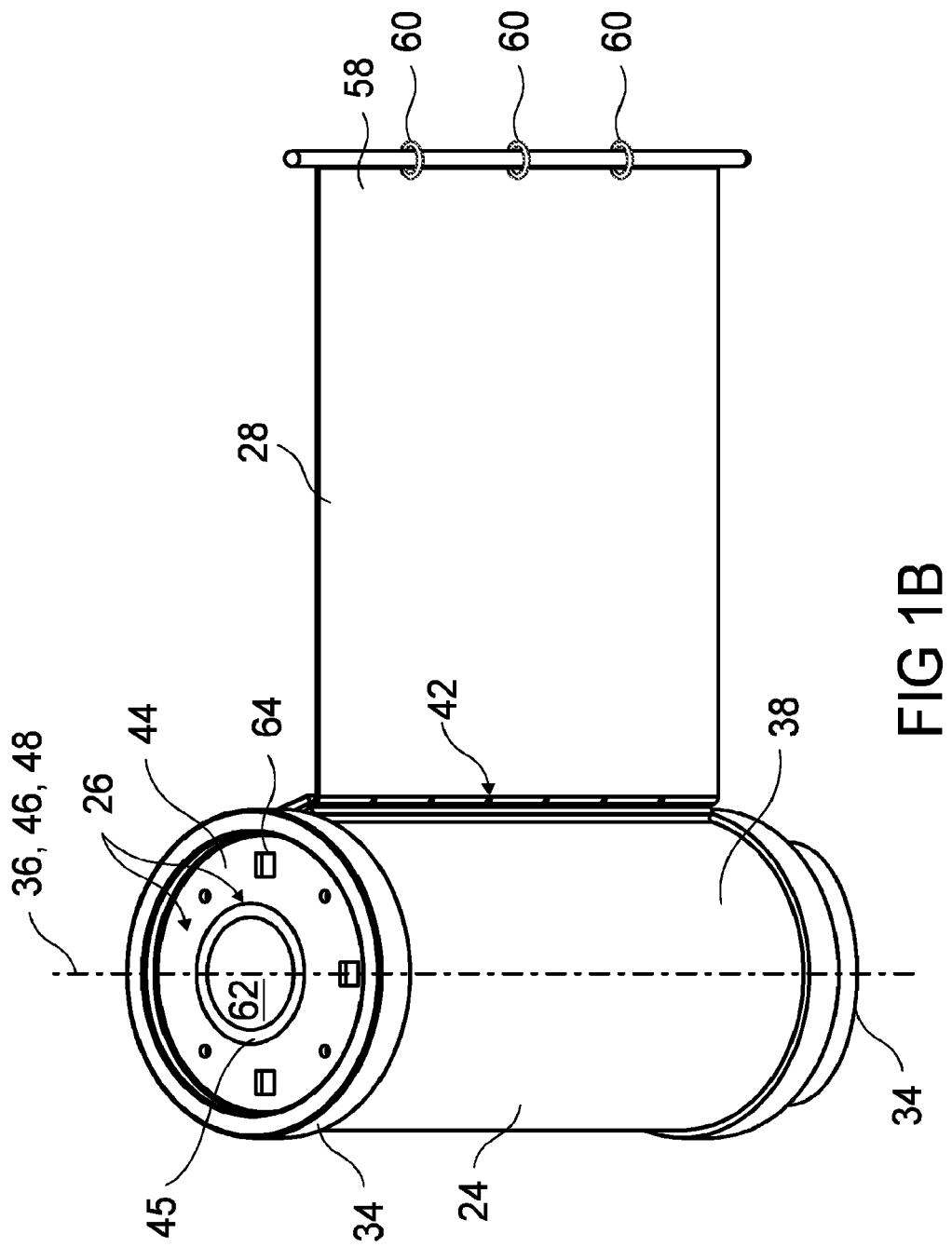
FIG. 1B shows a perspective view of the modular deployable display unit of FIG. 1A, illustrated with the flexible electronic display member of the display unit shown in an unwound configuration.

The flexible electronic display member 28 has a fixed end (not shown) which is coupled to the spool 45. The flexible electronic display member 28 further has an opposite free end 58 and mounting formations in the form of rings 60 connected to the free end 58, for mounting the flexible electronic display member 28 to the fixed support structure 18, as shown in FIG. 2. More particularly, the flexible electronic display member 28 is displaceable between: a deployed configuration wherein the flexible electronic display member extends outwardly for displaying the programmable message; and a stowed configuration wherein the flexible electronic display member takes up a relatively compact configuration. More specifically, the flexible electronic display member 28 is displaceable between a wound configuration, as illustrated in FIG. 1A, and an unwound configuration, as illustrated in FIGS. 1B and 2. In the wound configuration, as illustrated in FIG. 1A, the flexible electronic display member is wound onto the spool 45 and located within the chamber of the housing 24 for displacing the flexible electronic display member into the stowed configuration. In the unwound configuration, as illustrated in FIGS. 1B and 2, the flexible electronic display member 28 is unwound from the spool 45 for displacing the flexible electronic display member into the deployed configuration. More specifically, as shown in FIGS. 1B and 2, when the flexible electronic display member 28 is in the unwound configuration, the flexible electronic display member 28 at least partially extends from the opening 42 in the shell 38 of the housing 24. As shown in FIG. 2, the rings 60 of the display member 28 are mounted to the fixed support structure 18. In other embodiments (not shown) connecting members other than the rings 60 may be used, for example, the connecting members can be in the form of magnets, hooks, or other known connecting members known in the art.

In use, the openings 54 defined in the flexible support member 52 permits passage of wind therethrough when the flexible electronic display member 28 is in the unwound configuration. As such, due to the openings 54, the flexible support member 52 is suitable for use in the outdoors, even in places which are particularly windy.

The electrical cable 30 is configured for supplying electrical energy to the electronic display member 28 for powering the LEDs 50 for displaying the programmable message 49. In other embodiments (not shown) each unit 12 may be supplied with its own power source. This power source may be disposed within a housing (equivalent to the housing 24). In such a case the electrical wiring may be disposed inside the housing.

The connecting system 32 is configured for connecting the display units 12 to one another, in an end to end arrangement. More particularly, as shown in FIG. 2, the connecting system 32 is configured to connect a particular one of the ends 44 of the spool 45 to the end 44 of the spool 45 of the adjacent modular deployable display unit 12. The connecting system 32 includes complementary connecting formations 34 defined on the ends 44 of the spool 45. More particularly, the complementary connecting formations 34 define complementary male and female parts which interconnect to one another.

The connecting system 32 further include means, in the form of a cylindrical passage 62 defined by an inner side of the spool 45, for releasably connecting the modular deployable display unit 12 to the stand 14 for supporting the display unit 12 on the substrate surface 8. More particularly, the cylindrical passage 62 provides for releasably connecting the operative lower end of the spool 45 the stand 14, as will be explained in more detail below.

The connecting system 32 further include electrical connecting means in the form of electrical connecting formations 64 and wires 67 for delivering electrical energy to the LED's 50. The electrical connecting formations 64 are defined on each of the ends 44 of the spool 45 for electrically connecting the modular deployable display units 12 in electrical contact with one another. The connecting system 32 further includes electrical connecting means in the form of electrical connecting formations 66 located on the stand 14 (not shown in FIGS. 1 to 3, see FIGS. 4A and 4B) which are configured for electrically connecting the spool 45 of the deployable display unit 12 and the stand 14, to one another. More specifically, the electrical connecting formations 66 electrically connect to the connecting formations 64 of the ends 44 of the spool 45, when the spool 45 is mounted to the stand 14, in use, as will be explained in more detail hereinbelow. The wires 67 are connected to the electrical connecting formations 64 and are configured for carrying electrical energy to the LEDs 50 for illuminating the LEDs 50 for displaying the programmable message 49, as will be explained in more detail hereinbelow.

The stand 14 is connectable to the modular deployable display unit 12, as shown in FIG. 2 and is locatable upon the substrate surface 8, for supporting the display unit 12 on the substrate surface. The stand 14 includes a vertical tube 76 and a number of support legs 78 mounted to the tube 76 for supporting the tube 76 in a substantially vertical configuration. The tube 76 is configured for supporting the display unit 12. More particularly, the dimensions of the tube 76 and the dimensions of the cylindrical passage 62 of the spool 45 of the display unit 12 permits the tube 76 to be slidingly received within the passage 62 of the spool in a snug sliding fit, for releasably connecting the spool 45 and the stand 14 to one another, as illustrated in FIG. 2. In some embodiment (not shown), the connecting system 32 may include locking formations (not shown) for locking the stand 14 and the unit 12 to one another. These locking formations may be in the form of complementary formations defined on the passage 62 and the tube 76. In other embodiments, other means known in the art may be used for coupling the display unit 12 to tube 76.

The power source 16 is in the form of a battery 68 for supplying electrical power to the flexible electronic display members 28 of the deployable display units 12. More particularly, the battery 68 is electrically connected via the electrical cable 30 to the base 14 and to the deployable display units 12, as shown in FIG. 2, in an arrangement wherein the battery 68 supplies electrical power to the flexible electronic display members 28 of each the modular deployable display units 12. More specifically, the electrical cable 30 is electrically connected to the electrical connecting formations 66 located on the stand 14 for delivering electrical power thereto. When the units 12 are mounted to the stand 14 and electrically coupled thereto, the electrical connecting formations 66 of the stand 14 are in electrical contact with the electrical connecting formations 64 defined on each of the ends 44 of the spool 45 for electrically connecting the modular deployable display units 12 with one another. Furthermore, when the units 12 are mounted to the stand 14, the electrical connecting formations 66 of the stand 14 are in electrical contact with the battery 68, for delivering electrical power to the LEDs 50 of the flexible electronic display members 52, via the wires 67 which are connected between the LEDs 50 and the electrical connecting formations 64 defined on each of the ends 44 of the spool 45. Different power sources known in the art may be used. By way of non-limiting example, the power source may be stationary or portable such as portable lithium batteries.

The data input device 17 is in data communication with the flexible electronic display member 28 and is configured for inputting the programmable message 49. More specifically, the data input device 17 includes a data input port 70 to which a cellular phone (not shown), laptop (not shown), tablet (not shown), digital keypad (not shown) or other similar type of electronic device (not shown), is connected for inputting the programmable message. In other embodiments (not shown), the data input device may have a built-in input mechanism such as, for example, a touch pad or key pad for programming the message 49. In other embodiments (not shown), the data input device may have physical keys for selecting pre-programmed messages, such as, for example, messages stored on a portable fixed memory storage device. In an alternative embodiment (not shown), the data input device may include a wireless communication module, such as , for example, a so-called "Bluetooth" module for receiving data inputs from a mobile device such as a smartphone.

The support 18 is configured for supporting the flexible electronic display member 28, when the flexible electronic display member is in the unwound configuration, as shown in FIG. 2. More specifically, support 18 is configured for supporting the free end 58 of the flexible electronic display member 28 in an arrangement wherein the flexible electronic display member 28 extends between the spool 45 and the support 28, for displaying the programmable message 49, in use. The support 18 includes a base formation in the form of a stand 72 and an elongate support member in the form of a pole 74 which is mounted to the stand 72 in an arrangement wherein the pole 74 projects upwardly from the stand 72. More particularly, the stand 72 includes a support body in the form of a hollow vertical tube 76 to which the pole 74 is mounted and a number of support legs 78 mounted to the tube 76 for supporting the tube 76.

Figure 4A:
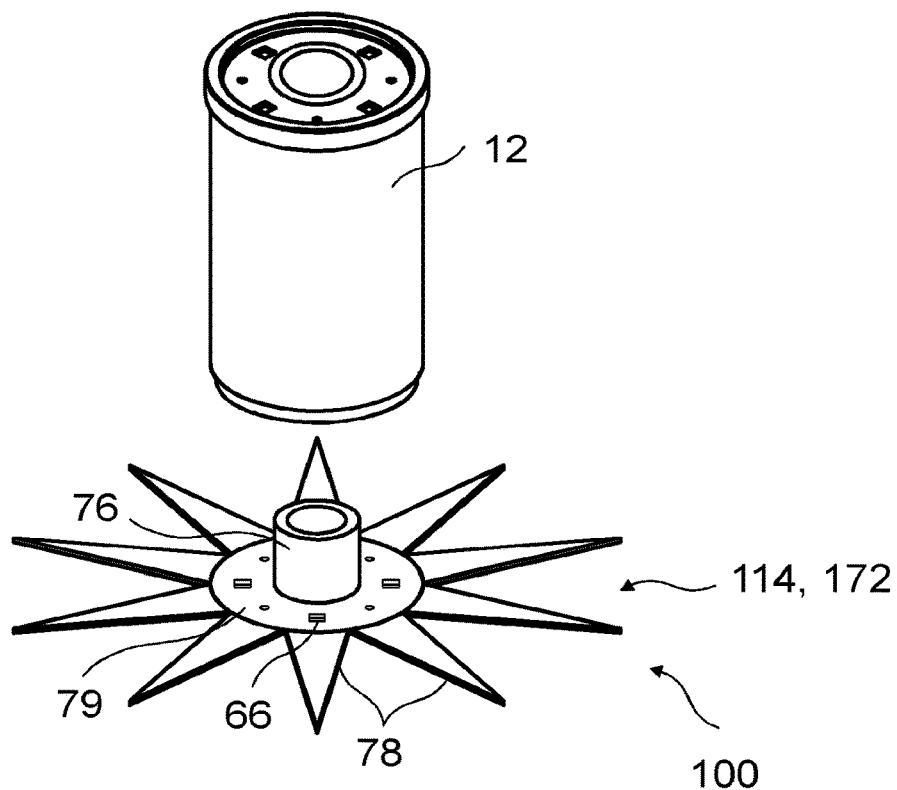
FIG. 4A shows a perspective view of another embodiment of a display system, in accordance with the invention.
Figure 4B:
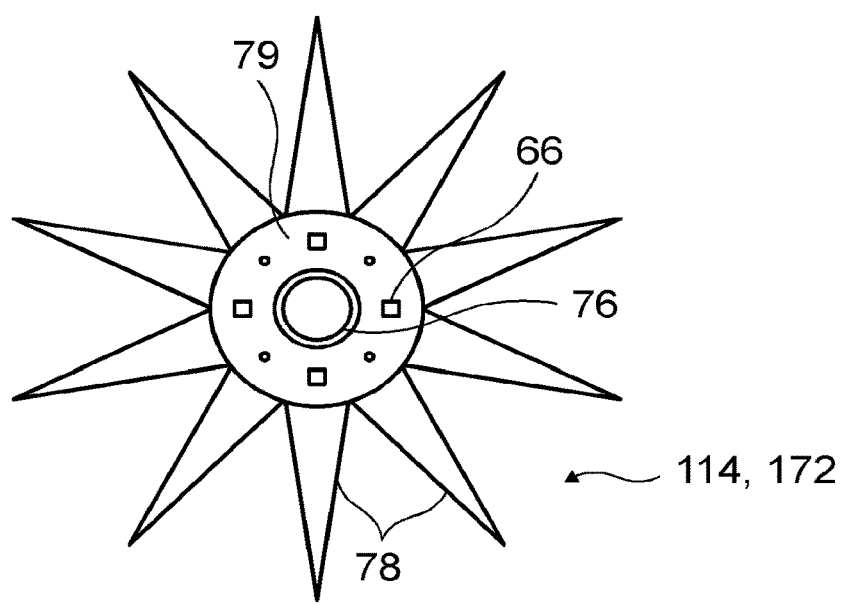
FIGS. 4B to 4E show perspective views of a stand forming a part of the display system of FIG. 4A, illustrated with support legs of the stand shown in various positions.
Figure 4C:
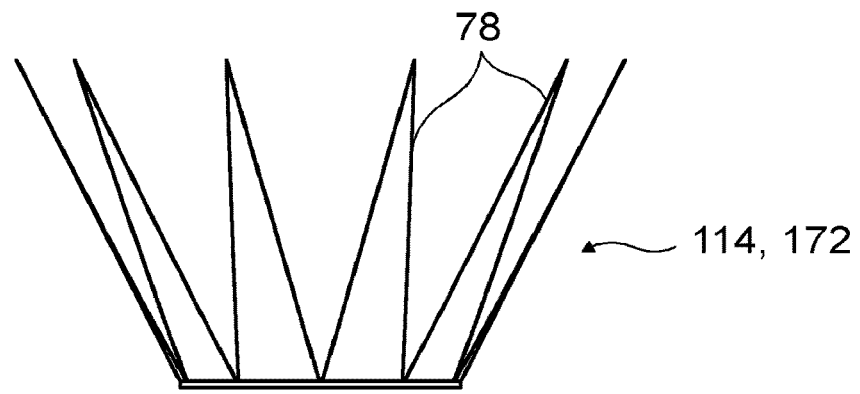
Figure 4D:
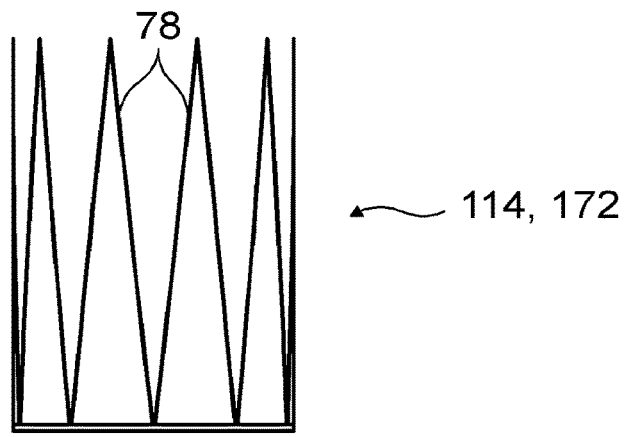
Figure 4E:
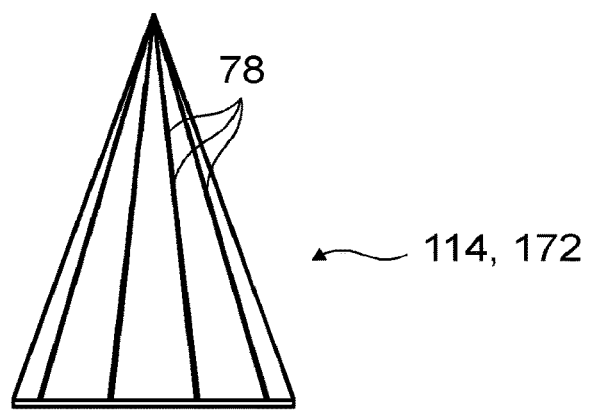

With reference to FIGS. 4A to 4E, another embodiment of a display system in accordance with the invention, in the form of a road traffic display system, is indicated generally by the reference numeral 100 (see FIG. 4A).

There are many similarities between the display system 10 of FIGS. 1 to 3 and the display system 100 of FIGS. 4A to 4E. In FIGS. 4A to 4E, the features of the system 100 which are the same and/or similar to features of the system 10 shown in FIGS. 1 to 3 of the drawings, are designated by the same and/or similar reference numerals in FIGS. 4A to 4E. What is stated above with respect to the system 10 of FIGS. 1 to 3 applies generally to the system 100 of FIGS. 4A to 4E.

The system 100 includes a modular deployable display unit 12 and a stand 114, 172, which differs from the stand 14, 72 of the system 10 of FIGS. 1 to 3.

More particularly, as illustrated in FIGS. 4A to 4E, the stand 114,172 includes a support body 79 and a number of support legs 78 mounted to the body 79 for support the body 79. The support body 79 has a circular shape in top view. The stand 114,172 further includes a hollow vertical tube 76 projecting substantially vertically upwardly from the support body 79.

The support legs 78 of the stand 114,172 have a triangular shape and are displaceably mounted to the support body 79 so as to be displaceable between a deployed position (shown in FIG. 4A) wherein the support legs 78 are placed into contact with the substrate surface 8 and locked in place, for stabilising the support body 79; and a stowed position (shown in FIG. 4E) wherein the support legs 78 fold inwardly towards the support body 79 so as to surround the support body 79 and assume a compact configuration, to facilitate stowage of the stand 114,172. More particularly, a proximal side of the support legs 78 is displaceably mounted to the support body 79 and two unattached sides of the support leg 78 are free. More specifically, each triangularly shaped support leg 78 is dimensioned so that when the support legs 78 are displaced into the stowed position, the unattached sides of the support leg 78 are disposed adjacent one another and placed into contact with one another, such that the support legs 78 and the support body 79 assume a cone shape.

Because the stand 114,172 includes a hollow vertical tube 76 and a number of support legs 78, the stand 114, 172 can perform the same function as the stand 14 and the stand 72. Accordingly the stand 114, 172 can be used to replace the stand 14 and/or the stand 72, shown in FIGS. 1 to 3. More specifically, when the stand 114,172 replaces the stand 72 of FIGS. 1 to 3, the pole 74 is mounted to the tube 76 in the same manner as is the case with the stand 72, as illustrated in FIG. 2. Furthermore, when the stand 114,172 replaces the stand 14 of FIGS. 1 to 3, the modular deployable display unit 12 is mounted to the tube 76 in the same manner in which the modular deployable display unit 12 shown in FIG. 2 is mounted to the stand 14. More specifically, the tube 76 is received within the hollow cylindrical passage 62 defined by the inner side of spool 45.

Figure 5A:
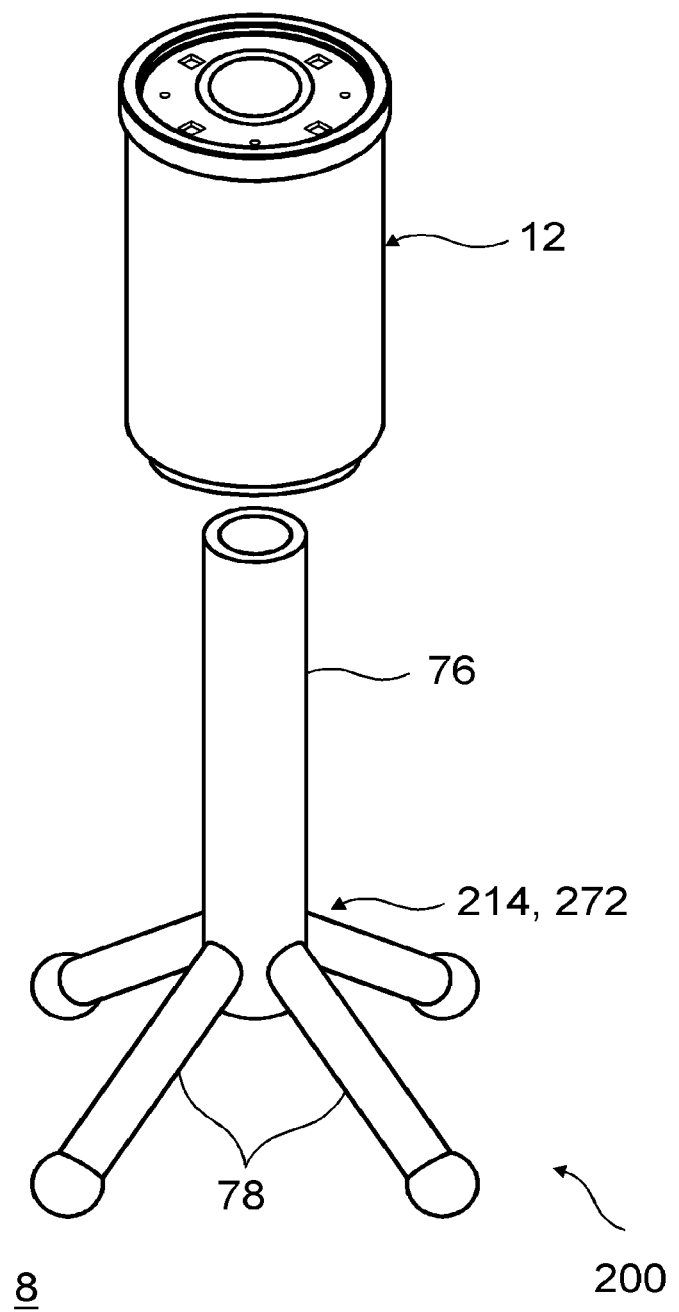
FIG. 5A shows an exploded perspective view of still another embodiment of a display system, in accordance with the invention.

With reference to FIG. 5A, another embodiment of a display system in accordance with the invention, in the form of a road traffic display system, is indicated generally by the reference numeral 200.

There are many similarities between the display system 10 of FIGS. 1 to 3 and the display system 200 of FIG. 5A. In FIG. 5A, the features of the system 200 which are the same and/or similar to features of the system 10 shown in FIGS. 1 to 3 of the drawings, are designated by the same and/or similar reference numerals in FIG. 5A. What is stated above with respect to the system 10 of FIGS. 1 to 3 applies generally to the system 200 of FIG. 5A.

The system 200 includes a modular deployable display unit 12 and a stand 214, 272, which differs from the stand 14, 72 of the system 10 of FIGS. 1 to 3.

More particularly, as illustrated in FIG. 5A, the stand 214, 272 includes a tube 76 and a number of support legs 78 mounted to the tube 76 for supporting the tube 76. Because the stand 214,272 includes the tube 76 and a number of support legs 78, the stand 214, 272 can perform the same function as the stand 14 and the stand 72. As such, the stand 214,272 can be a substitute for the stand 14, 72.

Figure 5B:
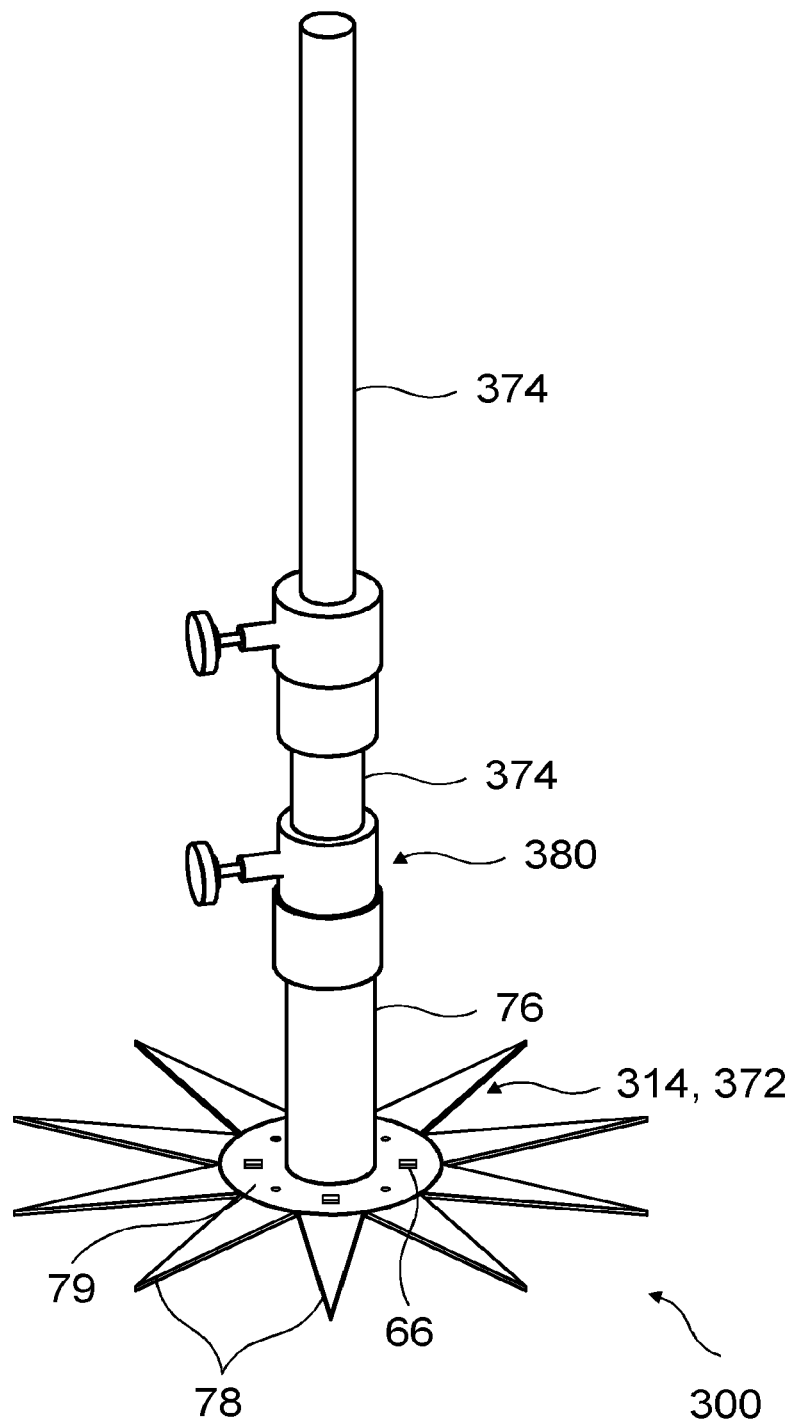
FIG. 5B shows an exploded perspective view of a final embodiment of a display system, in accordance with the invention.

With reference to FIG. 5B, another embodiment of a display system in accordance with the invention, in the form of a road traffic display system, is indicated generally by the reference numeral 300.

There are many similarities between the display system 10 of FIGS. 1 to 3 and the display system 300 of FIG. 5B. In FIG. 5B, the features of the system 300 which are the same and/or similar to features of the system 10 shown in FIGS. 1 to 3, are designated by the same and/or similar reference numerals in FIG. 5B. What is stated above with respect to the system 10 of FIGS. 1 to 3 of the drawings applies generally to the system 300 of FIG. 5B.

The system 300 includes a modular deployable display unit 12; a stand 314, 372 and an elongate support member in the form of a pole 374. The stand 314, 372 differs from the stand 14, 72 of the system 10 of FIGS. 1 to 3. More particularly, as illustrated in FIG. 5A, the stand 314,372 includes tube 76 which projects upwardly and a number of support legs 78 mounted to the tube 76 for supporting the tube 76.

Because the stand 314, 372 includes the tube 76 and the support legs 78, the stand 314, 372 can perform the same function as the stand 14 and the stand 72. As such, the stand 314,372 can be a substitute for the stand 14, 72.

The pole 374 of the system 300 differs from the pole 74 of the system 10 of FIGS. 1 to 3 of the drawings. More specifically, the pole 374 is telescopically extendible to facilitate stowage of the pole 374, in use. The applicant envisages that the pole 374 may be telescoped into a compact configuration and stowed within the cone shaped body formed by the support legs 78 when the stand 314,372 is displaced into the stowed position. In another embodiment (not shown), the applicant envisages that, in use, the pole 374 may be used in conjunction with the stand 114,172. In some embodiments, holding means 380 may be used to hold sections of the telescopically extendible pole 374 in an expanded position. Different holing means known in the art may be used to allow for holding the section of the telescopically extendible pole 374 in an expanded position and for the releasing or the section so that the pole 374 may be collapsible.

In another embodiment, not shown, the applicant envisages that a display system in accordance with the invention, will include a modular deployable display unit similar to the modular deployable display unit 12, but without a housing 24. Furthermore, in other embodiment (not shown) the applicant envisages that the free end 58 of the flexible electronic display member 28 will be connected to an additional spool assembly which is identical or similar to the spool assembly 26 described hereinabove. As such, the applicant envisages that the flexible electronic display member 28 will extend between the spools of the spool assemblies and can be wound on either one or both of these spools, in use. In other embodiments, (not shown), the flexible member may be permanently fixed at each end to a spool assembly similar to the spool assembly 26. In other embodiments (not show), the flexible member may be detachable from the spool to allow for maintenance and/or replacement of the flexible member.

The applicant also envisages that the system 10, 100, 200, 300 may be used in other circumstances, other than in the case of a traffic accident. For example, the applicant envisages that the system 10, 100, 200, 300 may be used at any mass gathering, disaster sight, evacuation sites, medical emergency, campus event, or the like. Furthermore, the applicant envisages that the system 10, 100, 200, 300 provides a highly portable display apparatus which can be used to form screens of desired sizes, depending on the requirements. More specifically, a desired number of modular deployable display units 12 can be connected to one another in an end to end arrangement so as to form a screen of a desired size.

The applicant envisages that the system 10, 100, 200, 300, can be easily transported in a police vehicle, due to its modular, compact and stowable features. More specifically, the applicant envisages that the system 10, 100, 200, 300 can be easily transported because the flexible electronic display member 28 can be displaced into the wound configuration. Furthermore, the applicant envisages that the system 10, 100, 200, 300 can be very quickly deployed and packed up and stowed due to the modular nature thereof and due to the fact that the flexible electronic display member 28 can be displaced into the wound configuration. Furthermore, the Applicant envisages that the system 10, 100, 200, 300, will be weather proof so as to stand up to a harsh environment. More specifically, the Applicant envisages that the system 10, 100, 200, 300 will be waterproof so as to function in a rainy environment.

Furthermore, the applicant envisages that when deployed at an accident scene, the flexible electronic display member 28 of the system 10, 100, 200, 300 will obstruct the accident scene and provide useful information to passing motorists, such as, for example, notification of the accident, or, alternatively, warning the passing motorists of a fine if they slow down the traffic. Because the flexible electronic display member 28 blocks the scene and provides information, the applicant envisages that passing motorists will not stop or slow down in order to satisfy their curiosity. As such, the applicant envisages that traffic jams can be avoided at an accident scene by deploying the system 10, 100, 200, 300.

The invention extends also to a modular deployable display unit 12, separate and apart from the system, as described and defined hereinabove. It will be understood that whereas in some embodiments, only one display unit 12 is shown, clearly, multiple display units 12 may be used in any of the described embodiments.

It will be appreciated that the exact configuration of the system 10, 100, 200, 300, and the unit 12, in accordance with the invention, may vary greatly while still incorporating the essential features of the invention as described hereinabove. For example, in another embodiment (not shown) the spool assembly (not shown) may include a spool (not shown) having a pair of opposite fixed ends (not shown). As such, the spool (not shown) is fixed to the ends (not show) and not rotatable relative to the ends (not shown), such that the spool (not shown) and the ends (not shown) are rotatable in unison with one another.

In another embodiment (not shown), the spool assembly may be similar to spool assembly 26, but may include a mechanism for winding and/or unwinding the flexible member onto and/or off the spool. Such mechanism may be manually or electrically operable for rotating the spool about its axis of rotation, for winding the flexible member onto the spool. Different mechanisms known in the art may be used for this purpose.

Figure 6:
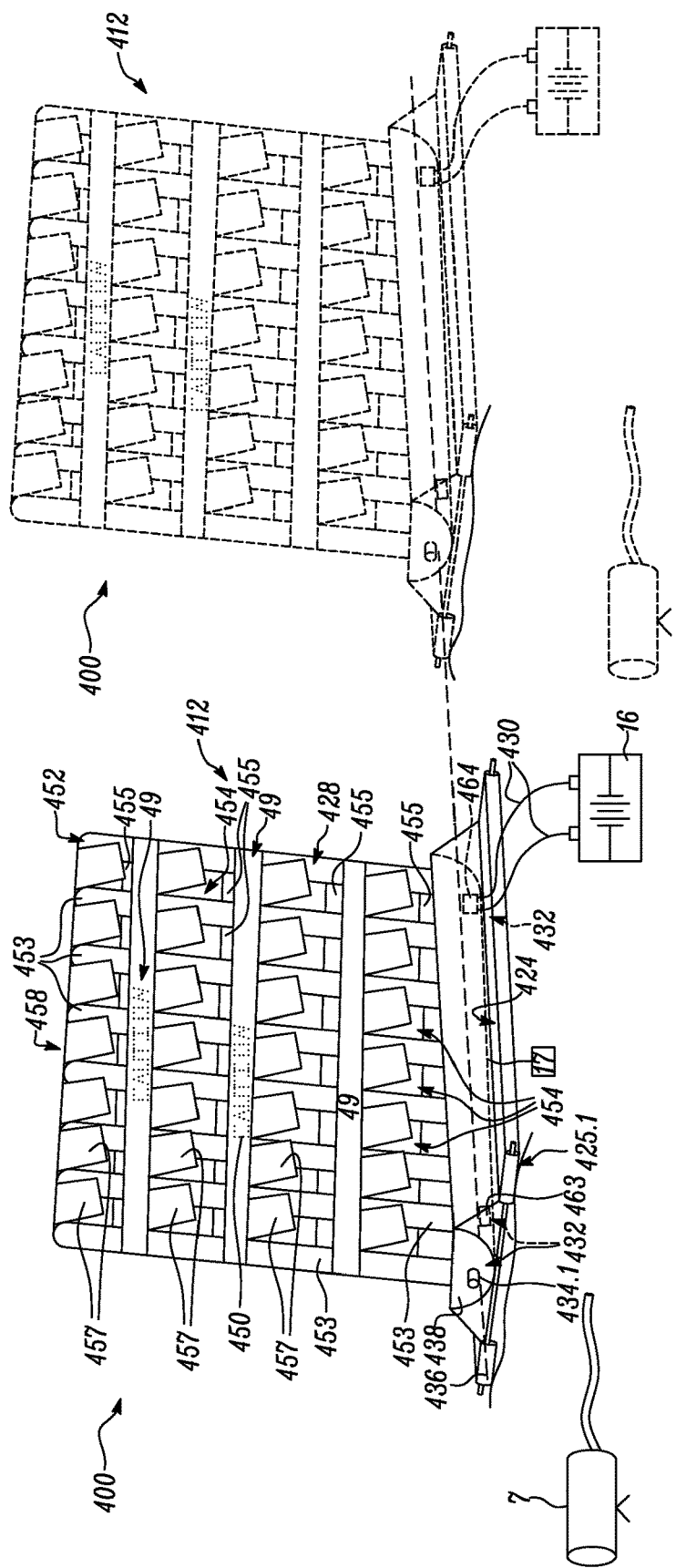
FIG. 6 shows a perspective view of another embodiment of a display system, in accordance with the invention.

With reference to FIGS. 6 to 8 of the drawings, another embodiment of a display system in accordance with the invention, in the form of a road traffic display system, is indicated generally by the reference numeral 400 (see FIG. 6).

There are many similarities between the display system 10 of FIGS. 1 to 3 and the display system 400 of FIGS. 6 to 8 of the drawings. In FIGS. 6 to 8 of the drawings, the features of the system 400 which are the same and/or similar to features of the system 10 shown in FIGS. 1 to 3 of the drawings, are designated by the same and/or similar reference numerals in FIGS. 6 to 8 of the drawings. What is stated above with respect to the system 10 of FIGS. 1 to 3 applies generally to the system 400 of FIGS. 6 to 8 of the drawings.

The system 400 includes a modular deployable display unit 412, a power source 16, a data input device 17, and an air compressor 7, the purpose of which will be explained in more detail hereinbelow.

More particularly, as illustrated in FIGS. 6 to 8 of the drawings each modular deployable display units 412 includes a housing 424, ballasting means in the form of a pair of ballasting rods 425, a flexible electronic display member 428, electrical cables 430 and a connecting system 432, the purpose of which will be explained hereinbelow.

Figure 7A:
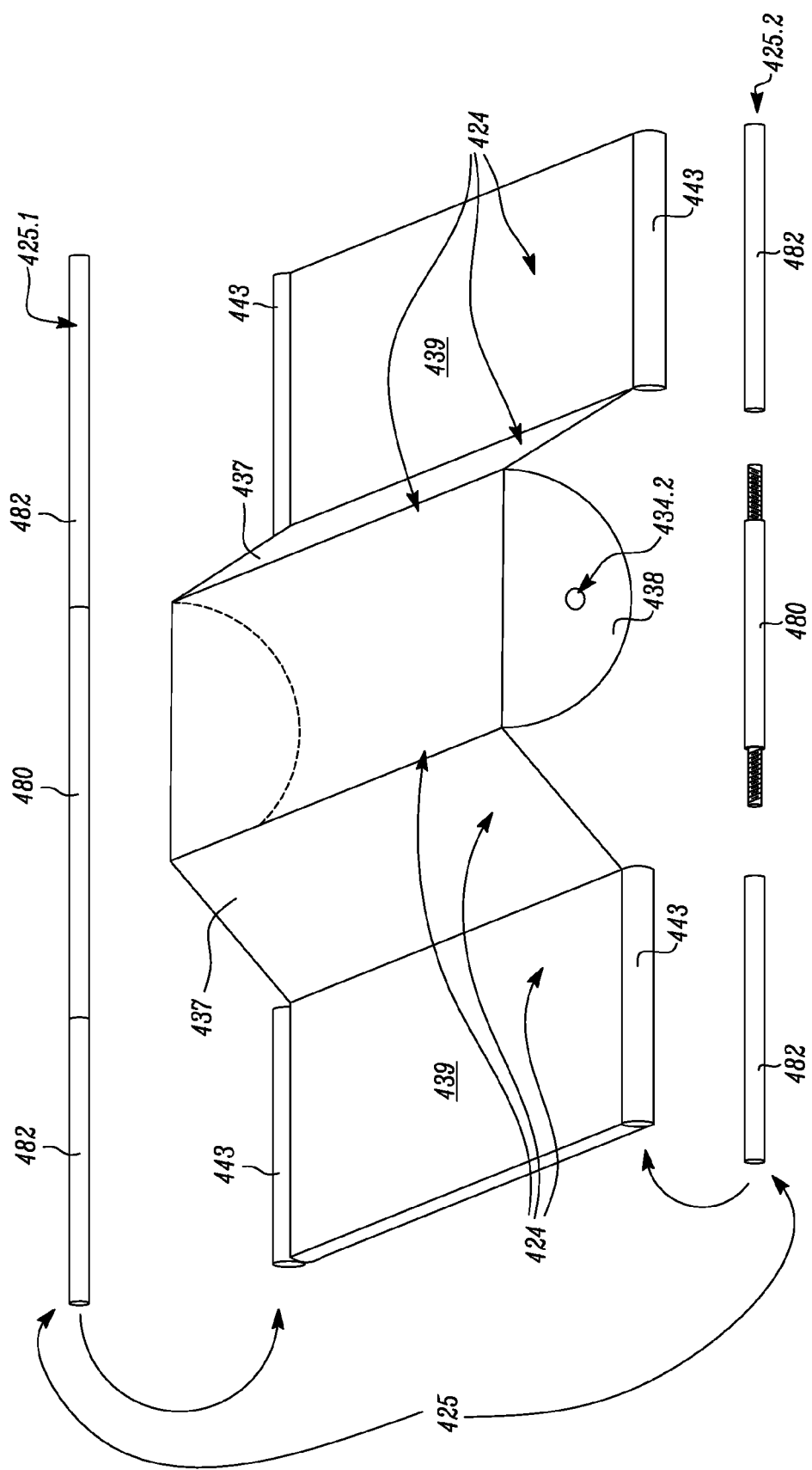
FIG. 7A shows an enlarged perspective view a part of the display system of FIG. 6, illustrated with certain components not shown and with other components shown in exploded view.

The housing 424 of each unit 412 has an elongate configuration and defines a pair of opposite ends and a longitudinal axis 436 extending between the ends. The housing 424 includes a hemi cylindrical hollow shell 438 a pair of hingiable displaceable portions in the form of lids and a pair of handles 441 (see FIGS. 8A to 8E), the purposes of which will be explained below. The shell 438 defines a hollow internal chamber located within the shell 438, the purpose of which will be explained in more detail hereinbelow. As best illustrated in FIG. 7A of the drawings, the lids includes a pair of inner webs 437 hingedly mounted to upper opposite long side edges of the shell 438; and a pair of outer webs 439 hingedly mounted to the ends of the inner web 437 such that the inner and outer webs 437,439 are hingedly displaceable relative to the shell 438 and to one another, as best illustrated in FIG. 8 of the drawings. The outer webs 439 each have a hollow tubular channel 443 located at opposite short ends thereof, for receiving the ballasting rods 425 therein. The purpose of the lids and the handles 441 will be explained in more detail hereinbelow.

Figure 7B:
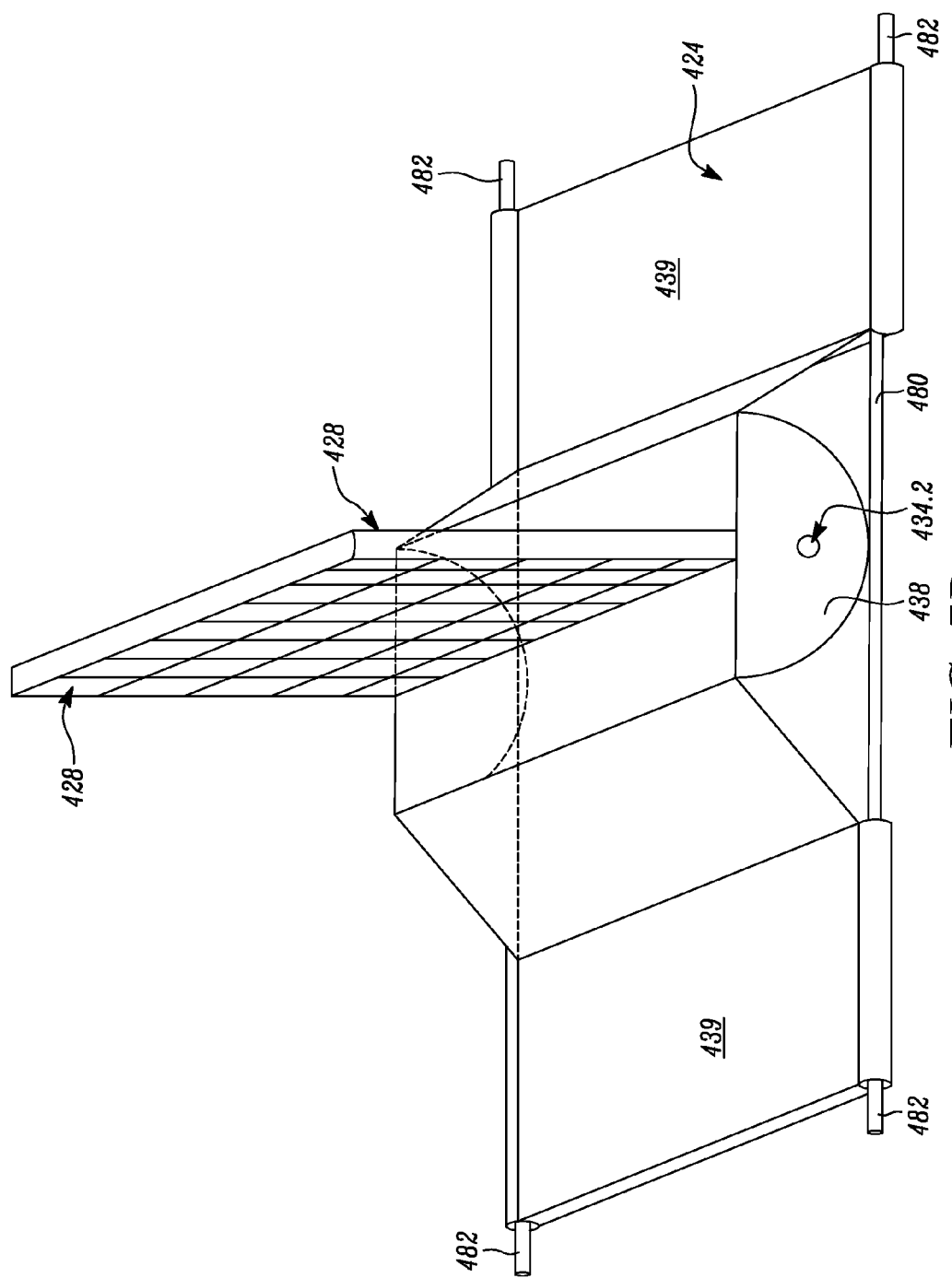
FIG. 7B shows a perspective view of the display system of FIG. 6, illustrated in use.

The pair of ballasting rods 425 include ballasting rods 425.1 and 425.2. Each ballasting rods 425.1, 425.2 are identical to one another and each comprise a central rod portion 480 having threaded ends; and two end rod portions 482 each having complementary threaded channels for threadable connection to a different one of the threaded ends of the central rod portion 480, as illustrated in FIG. 7A of the drawings. In use, the ballasting rods 425.1 and 425.2 are inserted into the hollow tubular channels 443 of the outer webs 439, as shown in FIG. 7B of the drawings, for providing ballast to the housing 424 for supporting the flexible electronic display member 428, as shown in FIG. 6 of the drawings.

The flexible electronic display member 428 is configured to display a programmable message 49, as explained above with reference to the display system 10. With reference to FIG. 6, the flexible electronic display member 428 includes a plurality of lamps in the form of light emitting diodes (LEDs) 450 for displaying the programmable message 49 and a flexible support member 452 for supporting the plurality of LEDs 450 thereon. The flexible support member 452 includes eight inflatable bodies in the form of cylindrical tubular columns 453; connecting webs 455 extending between the columns 453 for connecting the columns 453 to one another, and flap members 457. As shown in FIG. 6 of the drawings, the flexible support member 452 has a plurality of openings 454 extending therethrough. The flap members 457 are located within the opening 454, so as to cover the openings. The flap members 457 are fixed to the connecting webs 455 only at their upper ends thereof, so as to permit the flap members 457 to move when wind blows against the flexible electronic display member 428, thereby to permit wind to pass through openings 454 defined in the flexible support member 452, as illustrated in FIG. 6 of the drawings.

The flexible support member 452 is of a brightly coloured light reflective material, so as to enhance the visibility of the flexible electronic display member 428. The flexible support member 452 may be of a desired size. Furthermore, a size of openings 454 may vary according to the intended use and factors such as prevailing wind conditions. As such, due to the openings 454, the flexible support member 452 is suitable for use in the outdoors, even in places which are particularly windy.

The flexible electronic display member 428 has a fixed end (not shown) which is coupled to an inner side of the shell 438. The flexible electronic display member 428 further has an opposite free end 458.

The electrical cables 430 are configured for supplying electrical energy to the electronic display member 428 for powering the LEDs 450 for displaying the programmable message 49. In other embodiments (not shown) each unit 412 may be supplied with its own power source, such as, for example, a lithium ion rechargeable battery. In another embodiment (not shown) the power sources may be obtained from another type of battery, such as a 12V battery of a road vehicle, or may be obtained from a electrical socket connected to the electrical power grid. This power source may be disposed within a housing (equivalent to the housing 424). In such a case the electrical wiring may be disposed inside the housing.

The connecting system 432 includes complementary connecting formations 434.1, 434.2 defined on the ends of the housing 424 in the form of male connector parts 434.1 and female connector parts 434.2 which are complementary to one another and which interconnect to one another, in use. The connecting formations 434.1, 434.2 are configured for connecting the display units 412 to one another, in an end to end arrangement as illustrated in FIG. 6 of the drawings. More specifically, the connecting formations 434.1, 434.2 permit a desired number of display units 412 to be interconnected to one another in an end to end arrangement.

The connecting system 432 further includes means, in the form of a compressor connecting port 463 for connecting the air compressor 7 thereto, for connecting the compressor 7 to the flexible support member 452 so as to permit the compressor 7 to inflate the eight inflatable cylindrical tubular columns 453, in use, so as to displace the flexible support member 452 into the deployed configuration thereof.

The connecting system 432 further includes electrical connecting means in the form of electrical connecting formations 464 and wires (not shown) for delivering electrical energy to the LED's 450.

Figure 8A:
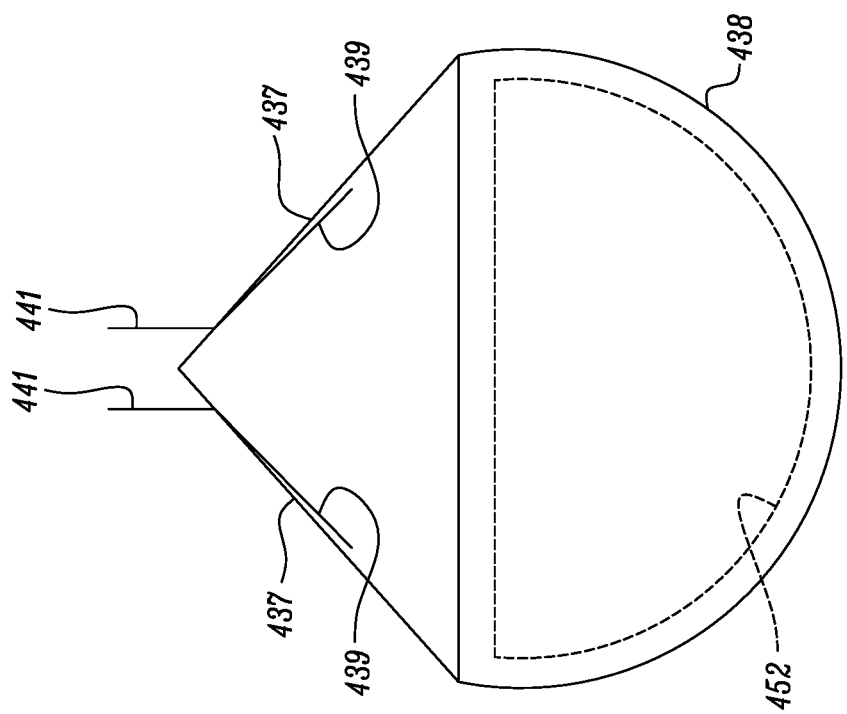
FIGS. 8A to 8E show an end view of a housing of the display system of FIG. 6, illustrated in various positions, in use.
Figure 8B:
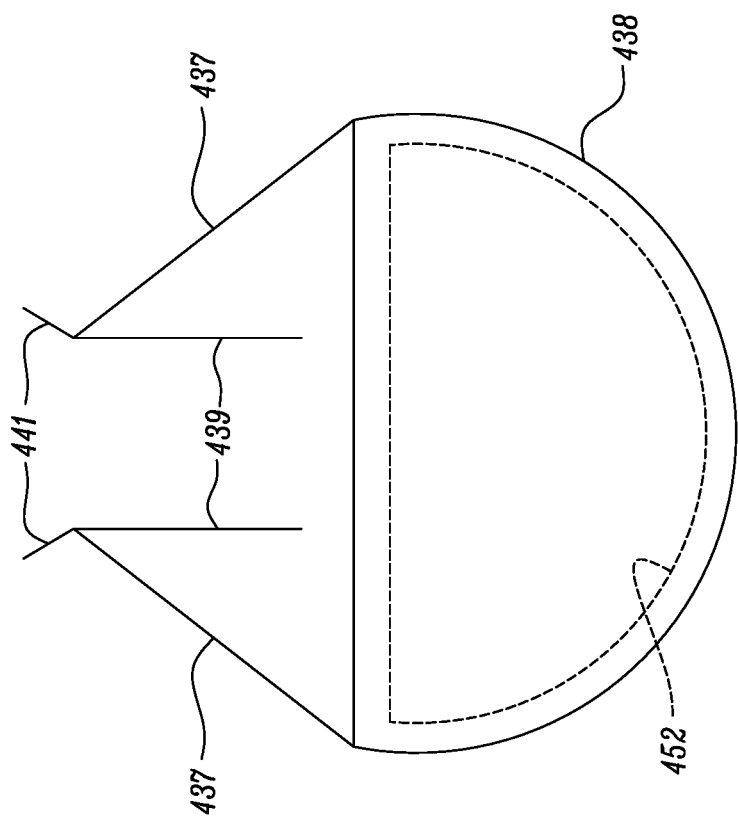
Figure 8C:
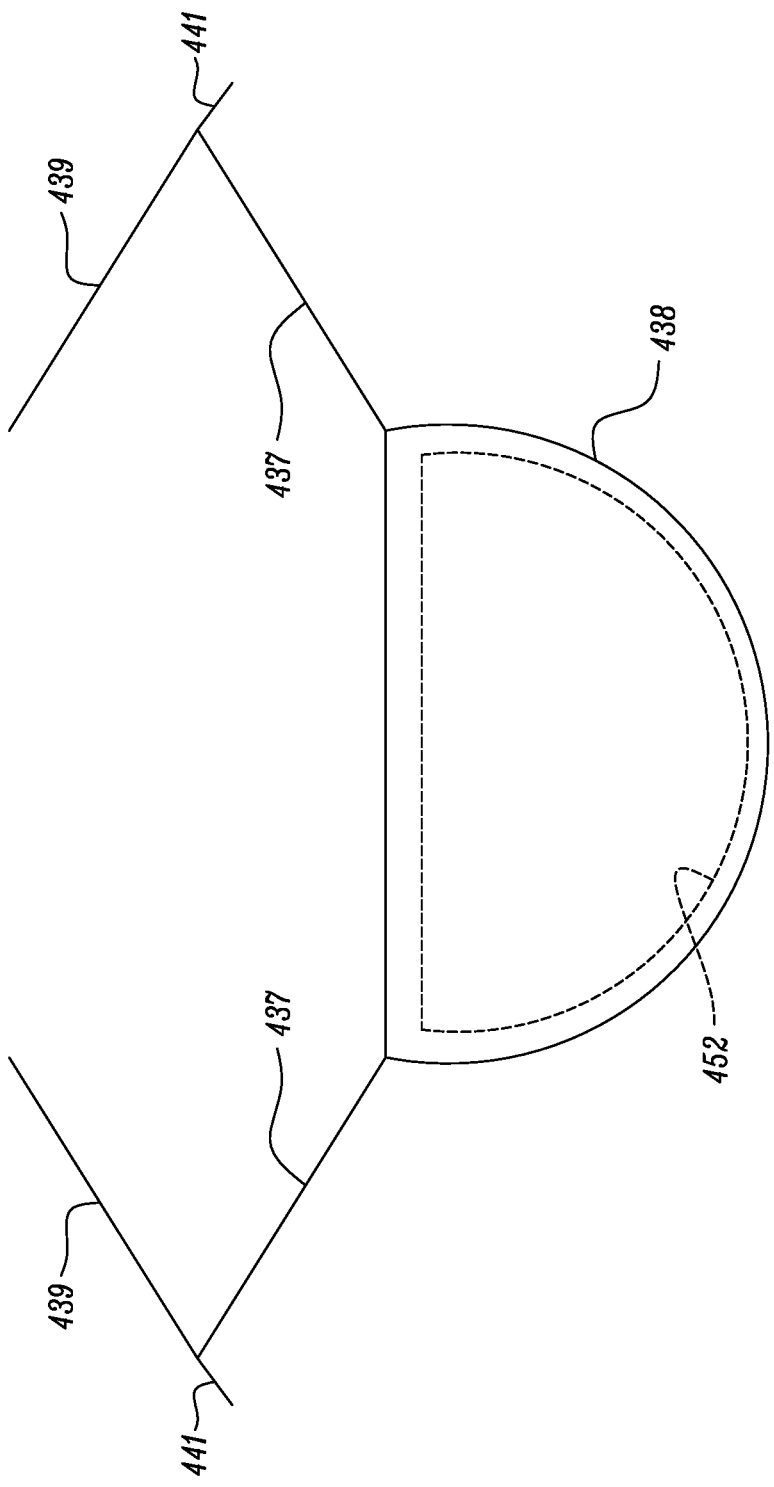
Figure 8D:
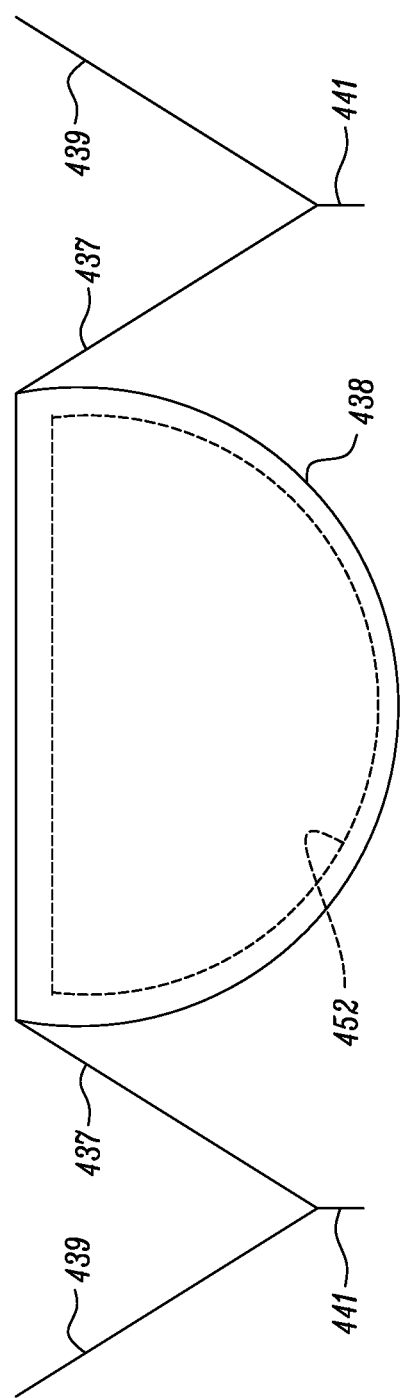

In use, the flexible electronic display member 428 is displaceable between a deployed configuration, as illustrated in FIG. 6 of the drawings and a stowed configuration, as illustrated in FIG. 8A of the drawings. In the deployed configuration, as illustrated in FIG. 6 of the drawings, the eight inflatable cylindrical tubular columns 453 are inflated, in use, for displacing the flexible electronic display member 428 into the deployed configuration such that the flexible electronic display member 428 extends outwardly from the housing 424 for displaying the programmable message. In the stowed configuration, as illustrated in FIG. 8A of the drawings, the cylindrical tubular columns 453 of the flexible electronic display member 428 are deflated such that the flexible electronic display member 428 takes up a relatively compact configuration and is located within the chamber of the housing 424 for stowage and transport purposes.

In use, the lids permit the housing 424 to be displaceable between a stowage configuration shown in FIG. 6 wherein the housing 424 and the lids enclose the flexible electronic display member 428, for housing the flexible electronic display member 428 when the flexible electronic display member 428 is in the stowed configuration; and a deployed configuration wherein the housing 424 permits the flexible electronic display member 428 to extend outside the housing 424 for displaying the programmable message when the flexible electronic display member 428 is in the deployed configuration.

Figure 8E:
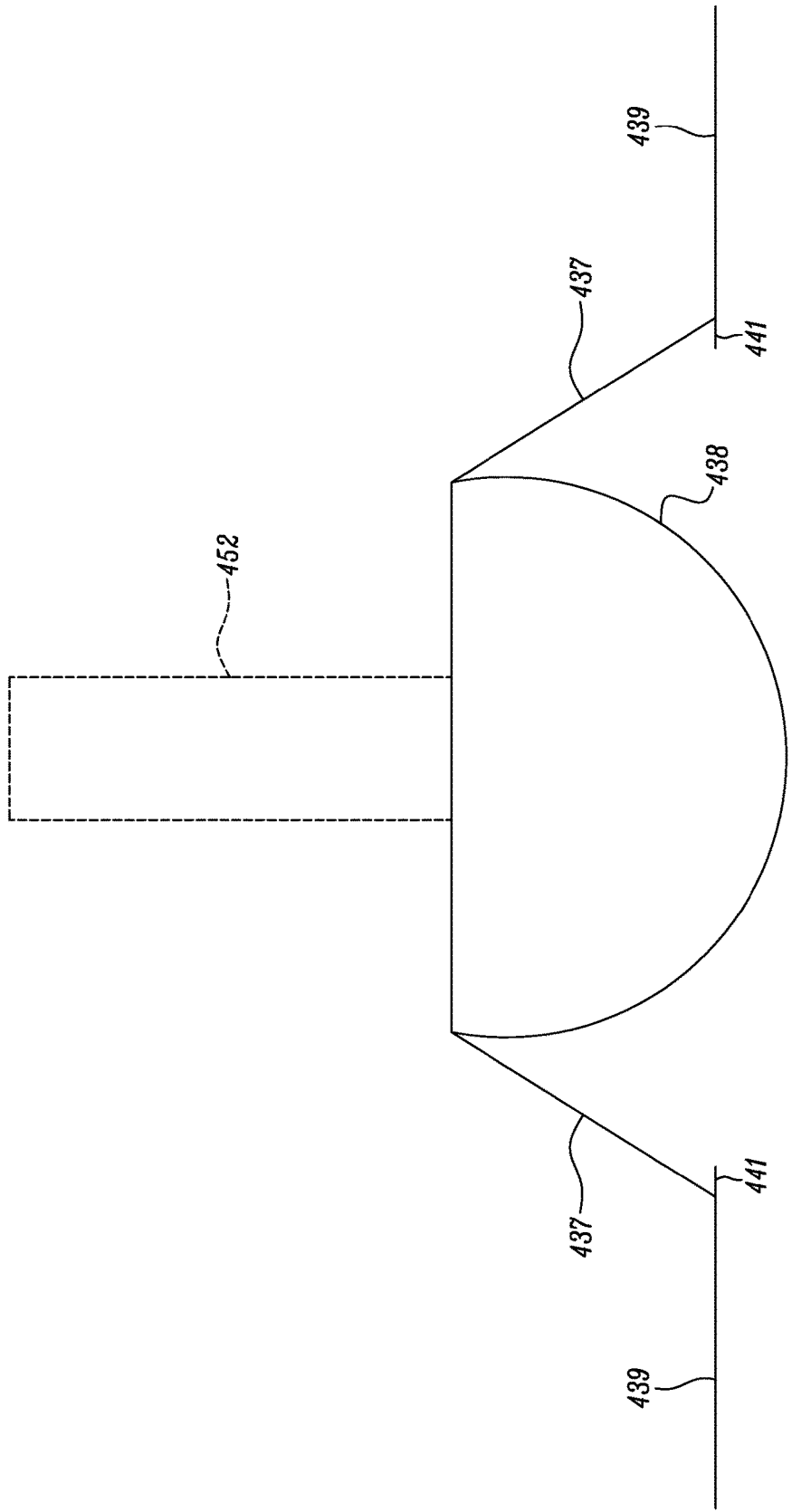

FIGS. 8A to 8E show the lids in various positions as the housing 424 is displaced from the stowage configuration shown in FIG. 8A of the drawings to the deployed configuration shown in FIG. 8E of the drawings. As shown in FIG. 8A of the drawings when in the stowage configuration, the webs of the lid close the hollow internal chamber located within the shell 438 for housing the flexible electronic display member 428 for stowage purposes, with the handles 441 adjacent one another to permit a user to grip the handles 441 for easy manipulation and handling of the modular deployable display units 412. As shown in FIGS. 7A and 7B of the drawings, when in the deployed configuration of the housing, the lids and the ballasting rods 425.1, 425.2 provide a sturdy support for supporting the shell and the flexible electronic display member connected thereto when the flexible electronic display member is in the deployed configuration.

With reference to FIGS. 9A to 9F of the drawings, another embodiment of a display system in accordance with the invention, in the form of a road traffic display system, is indicated generally by the reference numeral 500.

There are many similarities between the display system 10 of FIGS. 1 to 3 and the display system 500 of FIG. 9 of the drawings. In FIGS. 9A to 9F of the drawings, the features of the system 500 which are the same and/or similar to features of the system 10 shown in FIGS. 1 to 3 of the drawings, are designated by the same and/or similar reference numerals in FIGS. 9A to 9F of the drawings. What is stated above with respect to the system 10 of FIGS. 1 to 3 applies generally to the system 500 of FIGS. 9A to 9F of the drawings.

The system 500 includes a modular deployable display unit 512, a power source 16, a data input device 17, and an air compressor 7, the purpose of which will be explained in more detail hereinbelow.

More particularly, as illustrated in FIG. 9 of the drawings each modular deployable display units 512 includes a housing 524, a flexible electronic display member 528, electrical cables 530 and a connecting system, the purpose of which will be explained hereinbelow.

The housing 524 of each unit 512 has an elongate configuration and defines a pair of opposite ends and a longitudinal axis 536 extending between the ends. The housing 524 includes a hemi cylindrical hollow shell 538 a pair of hingiable displaceable portions in the form of lids 590.1, 590.2 and a handle 541, the purposes of which will be explained below. The shell 538 defines a hollow internal chamber located within the shell 538, the purpose of which will be explained in more detail hereinbelow. As best illustrated in FIG. 9B of the drawings, the lids 590.1 and 590.2 are each displaceably mounted to the shell 538, as shown in FIG. 9B of the drawings for reasons which will be explained in more detail hereinbelow.

The flexible electronic display member 528 is configured to display a programmable message 49, as explained above with reference to the display system 10. With reference to FIG. 9C of the drawings, the flexible electronic display member 528 includes a plurality of lamps in the form of light emitting diodes (LEDs) 550 for displaying the programmable message 49 and a flexible support member 552 for supporting the plurality of LEDs 550 thereon. The Applicant envisages that the LEDs 550 may be arranged across the surface of the flexible support member 552 in any desired configuration. For example, the Applicant envisages that the LEDs 550 may be arranged in LED strips and envisages that the LED strips can be programmed to work together in unison. Alternatively, the Applicant envisages that the LEDs 550 may be distributed uniformly across the surface of the flexible support member 552. The flexible support member 552 is inflatable, as will be explained in more detail hereinbelow and includes a plurality of opening 554 and a plurality of flap members 557 as best illustrated in FIG. 9E of the drawings. The flap members 557 are located adjacent the opening 554 and are fixed to the flexible support member 552 only at their upper ends thereof, so as to permit the flap members 557 to move when wind blows against the flexible electronic display member 528, thereby to permit wind to pass through openings 554 defined in the flexible support member 552, as best illustrated in FIGS. 9E and 9F of the drawings. More specifically, as illustrated in FIG. 9F of the drawings, when the wind speed is low, the flap members 557 are only slightly displaced by the wind and the flap members 557 accordingly block a substantial part of the openings 554. As the wind speed increases, the flap members 557 are displaced progressively more and more by the wind so as to reveal progressively more of the opening 554 as shown in FIG. 9F of the drawings. As shown in FIGS. 9C and 9D of the drawings, when there is substantially no wind, the flap members 557 completely cover the opening 554.

The flexible support member 552 is of a brightly coloured light reflective material, so as to enhance the visibility of the flexible electronic display member 528. The flexible support member 552 may be of a desired size. Furthermore, a size of openings 554 may vary according to the intended use and factors such as prevailing wind conditions. As such, due to the openings 554, the flexible support member 552 is suitable for use in the outdoors, even in places which are particularly windy.

The flexible electronic display member 528 has a fixed end (not shown) which is coupled to an inner side of the shell 538. The flexible electronic display member 528 further has an opposite free end 558.

The electrical cables 530 are configured for supplying electrical energy to the electronic display member 528 for powering the LEDs 550 for displaying the programmable message 49. In other embodiments (not shown) each unit 512 may be supplied with its own power source. This power source may be disposed within a housing (equivalent to the housing 524). In such a case the electrical wiring may be disposed inside the housing.

The connecting system includes complementary connecting formations 534 defined on the ends of the housing 524 in the form of a male connector parts 534.1 and a female connector parts 534.2 which are complementary to one another and which interconnect to one another, in use. The connecting formations 534 are configured for connecting the display units 512 to one another, in an end to end arrangement as illustrated in FIG. 9C of the drawings. More specifically, the connecting formations 534 permit a desired number of display units 512 to be interconnected to one another in an end to end arrangement.

The connecting system further includes means, in the form of a compressor connecting port 563 for connecting the air compressor 7 thereto, for connecting the compressor 7 to the flexible support member 552 so as to permit the compressor 7 to inflate the flexible support member 552, in use, as will be explained in more detail hereinbelow.

The connecting system further includes electrical connecting means in the form of electrical connecting formations 564 and wires (not shown) for delivering electrical energy to the LED's 550.

Figure 9A:
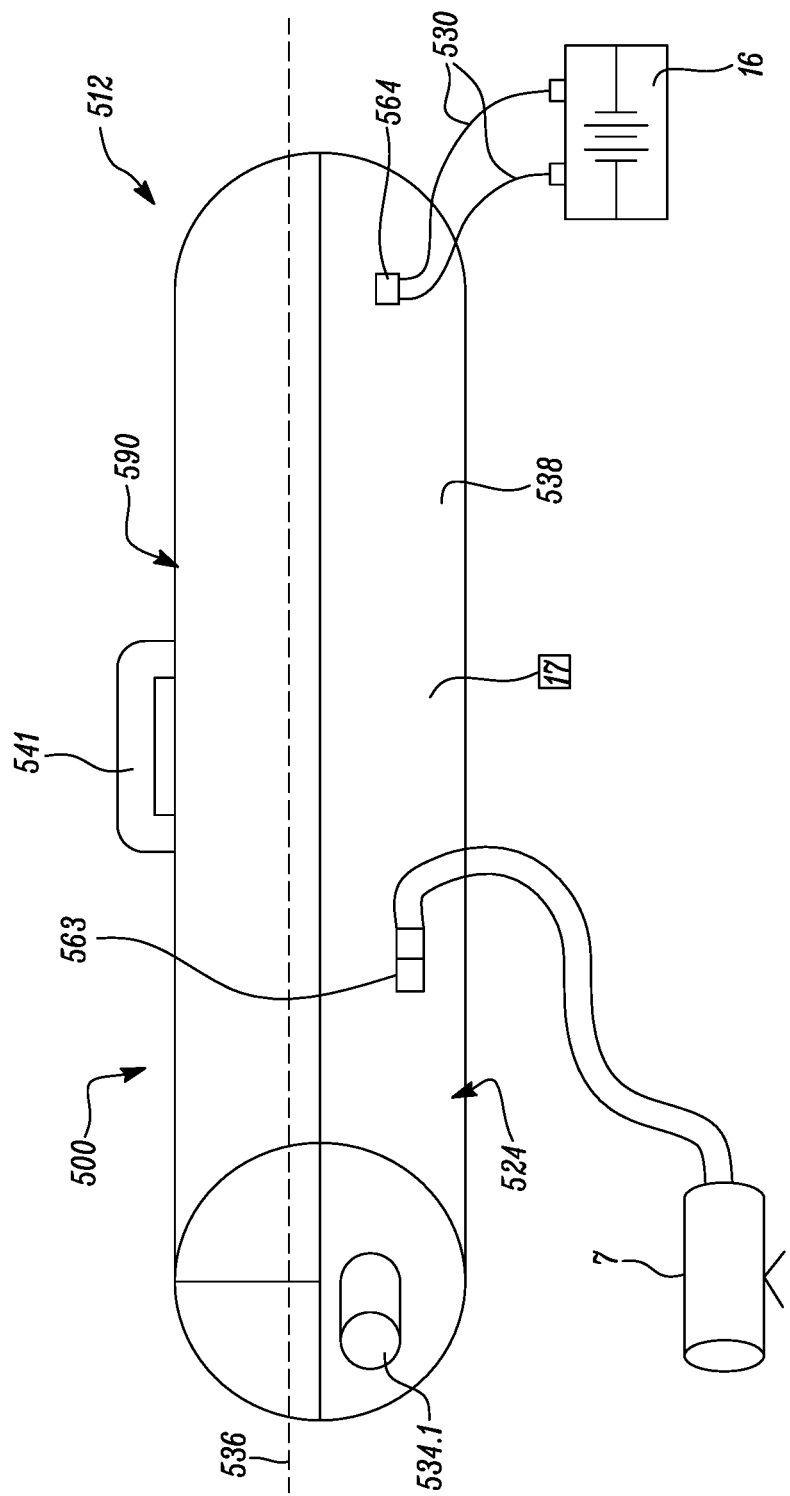
FIG. 9A shows a perspective view of yet another embodiment of a display system, in accordance with the invention.
Figure 9B:
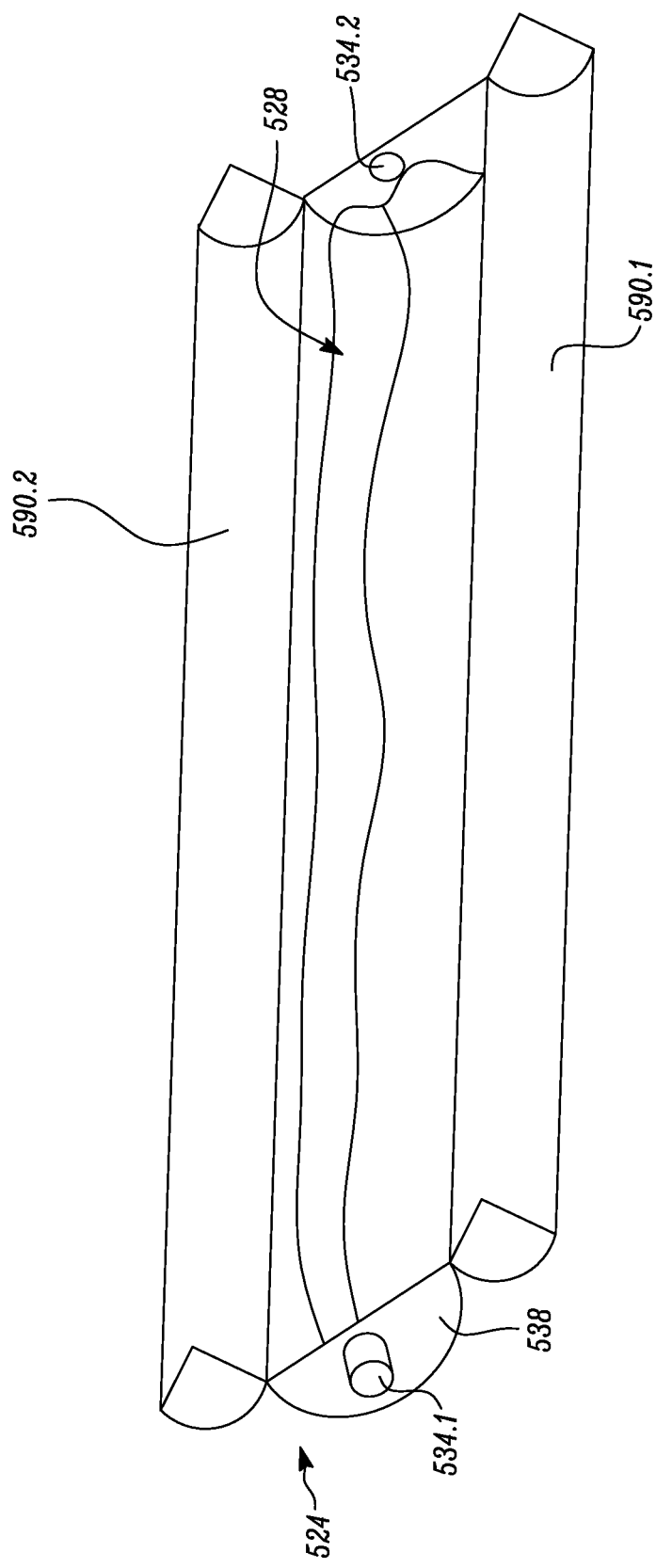
FIG. 9B shows a perspective view of the display system of FIG. 9A, shown in use.
Figure 9C:
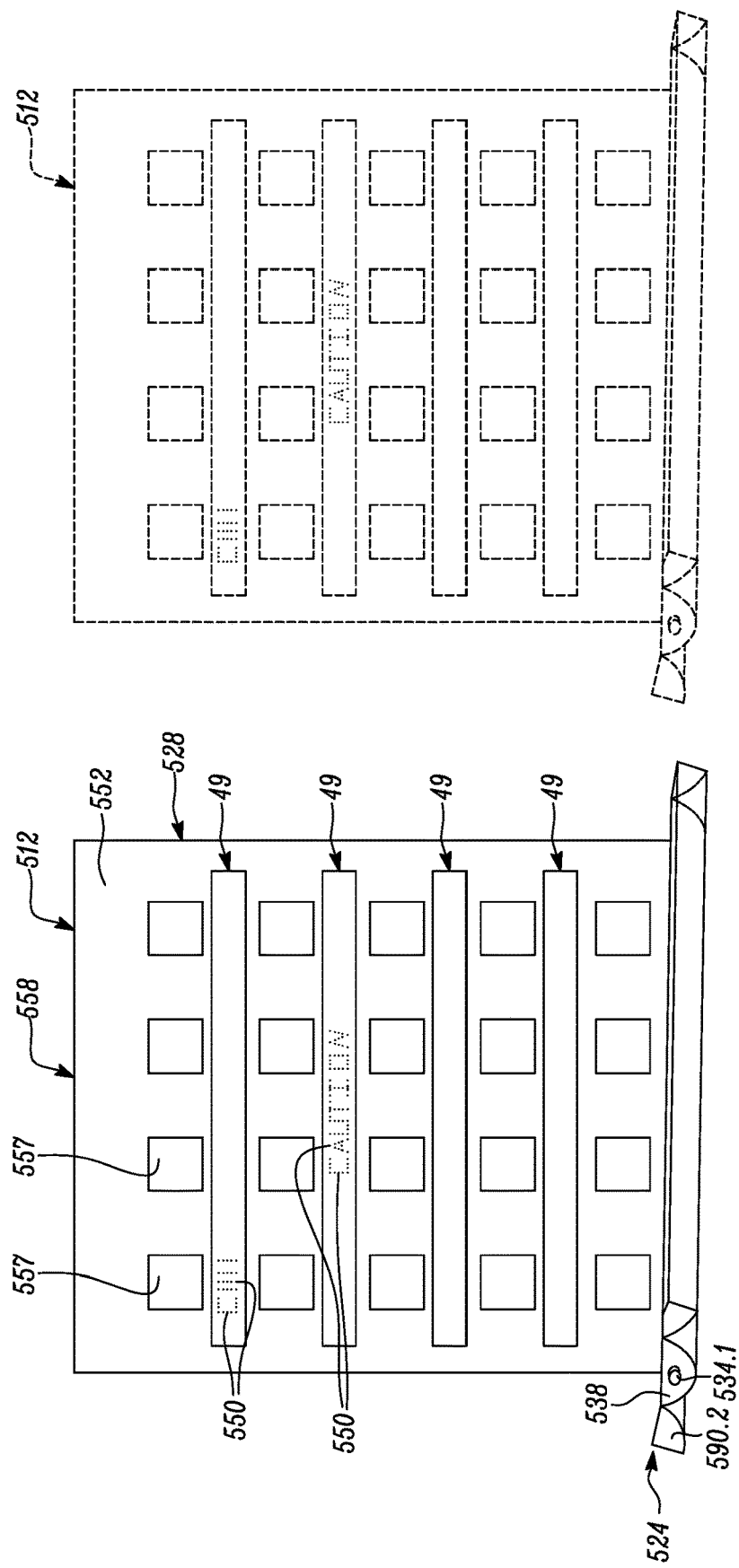
FIG. 9C shows a front perspective view of the display system of FIG. 9A, shown in use.
Figure 9D:
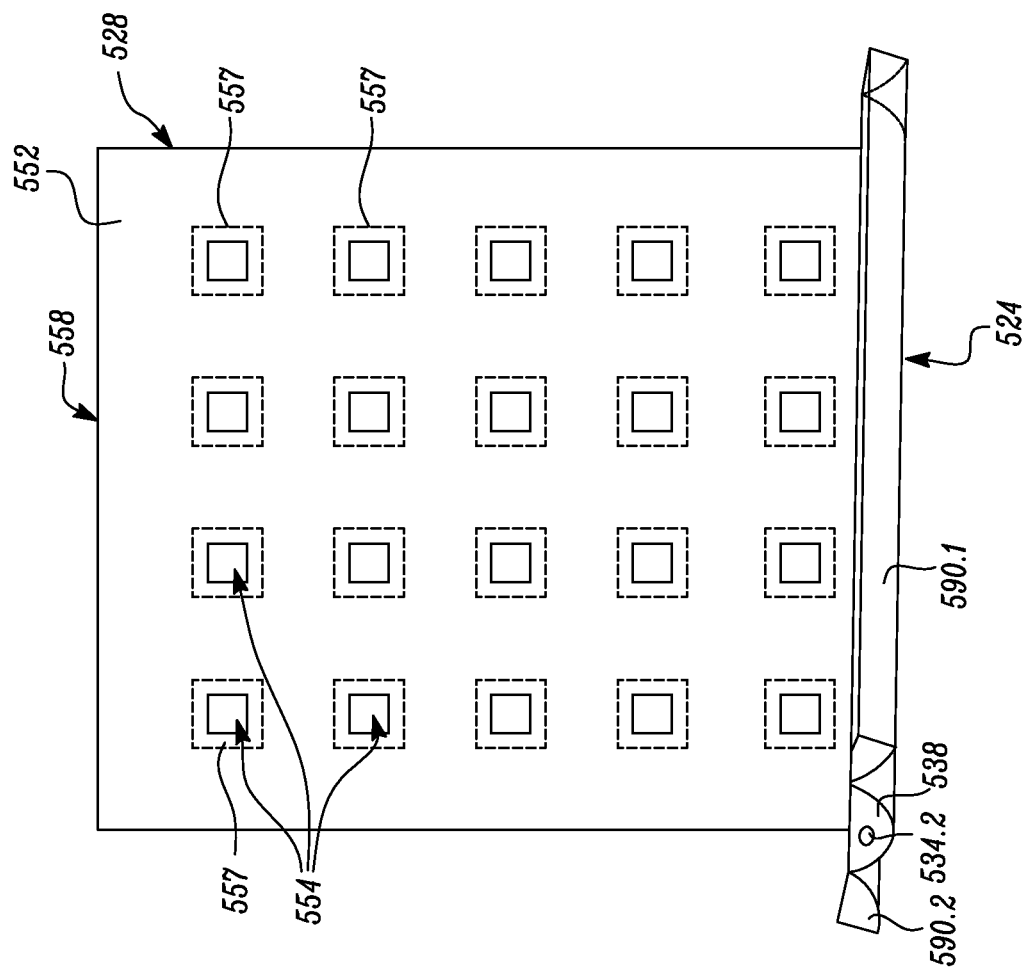
FIG. 9D shows a rear perspective view of the display system of FIG. 9A, shown in use.
Figure 9E:
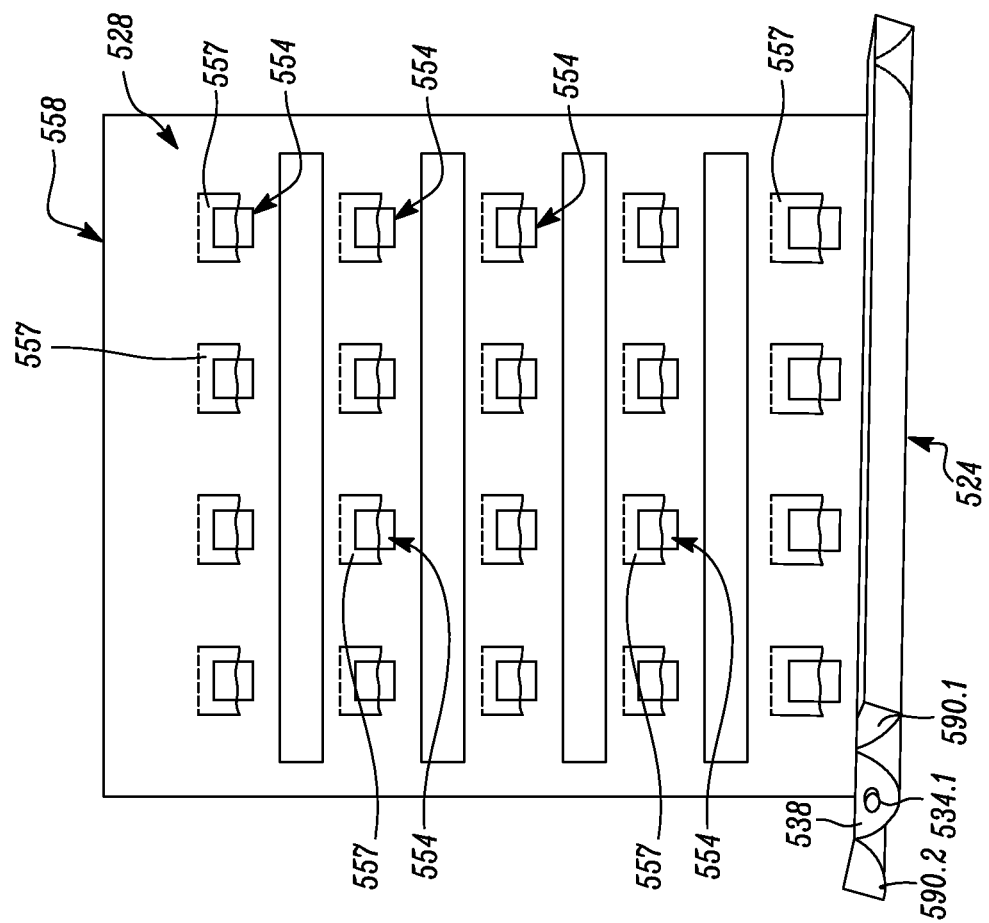
FIG. 9E shows a front perspective view of the display system of FIG. 9A, shown in use, in windy conditions.

In use, the flexible electronic display member 528 is displaceable between a deployed configuration, as illustrated in FIG. 9C of the drawings and a stowed configuration, as illustrated in FIG. 9A of the drawings. In the deployed configuration, as illustrated in FIG. 9C of the drawings, the flexible electronic display member 528 is inflated, in use, for displacing the flexible electronic display member 528 into the deployed configuration such that the flexible electronic display member 528 extends outwardly from the housing 524 for displaying the programmable message 49. In the stowed configuration, as illustrated in FIG. 9A of the drawings, the flexible electronic display member 528 is deflated such that the flexible electronic display member 528 takes up a relatively compact configuration and is located within the chamber of the housing 524 for stowage and transport purposes. More specifically, FIG. 9B show the compact configuration of the flexible electronic display member 528 within the housing 524.

In use, the lids 590.1, 590.2 permit the housing 524 to be displaceable between a stowage configuration and a deployed configuration. When in the stowage configuration as shown in FIG. 9A, the hemi cylindrical hollow shell 538 and the lids 590.1, 590.2 enclose the flexible electronic display member 528, for housing the flexible electronic display member 528 when the flexible electronic display member 528 is in the stowed configuration. When in the deployed configuration as shown in FIG. 9C of the drawings, the housing 524 permits the flexible electronic display member 528 to extend outside the housing 524 for displaying the programmable message 49 when the flexible electronic display member 528 is in the deployed configuration.

As shown in FIG. 9A of the drawings the handles 541 permit a user to conveniently grip the handles 541 for easy manipulation and handling of the modular deployable display units 512.

The Applicant envisages that the system 400 and 500 is highly advantageous because the system 400, 500 includes connecting formations 434, 534, respectively, which are configured for connecting the display units 412, 512, respectively, to one another, in an end to end arrangement as illustrated in FIGS. 6 and 9C, respectively. In this regard the Applicant believes that the system 400 and 500 will be highly effective for use at a particularly large accident scene. In this regard, the Applicant believes that multiple modular deployable display units 412/512 may be connected to one another in an end to end arrangement such that the flexible electronic display members 428, 528 of the multiple modular deployable display units 412/512 may act as a screen for blocking the view of the accident scene. In this way the multiple modular deployable display units 412/512 will be useful to block even a large accident scene and provides information at the same time. As such, the applicant envisages that passing motorists will not stop or slow down in order to satisfy their curiosity as it will not be possible to view the scene blocked by the flexible electronic display member 428, 528 of the multiple modular deployable display units 412/512.

Interpretation of Terms

Unless the context clearly requires otherwise, throughout the description and the claims:

- "comprise," "comprising," and the like are to be construed in an inclusive sense, as opposed to an exclusive or exhaustive sense; that is to say, in the sense of "including, but not limited to".
- "connected," "coupled," or any variant thereof, means any connection or coupling, either direct or indirect, between two or more elements; the coupling or connection between the elements can be physical, logical, or a combination thereof.
- "herein," "above," "below," and words of similar import, when used to describe this specification shall refer to this specification as a whole and not to any particular portions of this specification.
- "or," in reference to a list of two or more items, covers all of the following interpretations of the word: any of the items in the list, all of the items in the list, and any combination of the items in the list.
- the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A modular deployable display unit including: a flexible electronic display member which is configured to display a programmable message, the flexible electronic display member being displaceable between: a deployed configuration wherein the flexible electronic display member extends outwardly for displaying the programmable message; and a stowed configuration wherein the flexible electronic display member takes up a relatively compact configuration; at least one electrical cable for supplying electrical energy to the flexible electronic display member; and at least one connecting formation configured for physically releasably connecting the modular deployable display unit to an additional modular deployable display unit, in an end to end arrangement.

2. The modular deployable display unit as claimed in claim 1, wherein the modular deployable display unit includes a housing for stowing the flexible electronic display member when the flexible electronic display member is in the stowed configuration.

3. The modular deployable display unit as claimed in claim 2, wherein the at least one connecting formation comprises two or more complementary connecting formations formed on the housing.

4. The modular deployable display unit as claimed in claim 2, wherein the housing is dispaceable between a stowage configuration wherein the housing houses the flexible electronic display member when the flexible electronic display member is in the stowed configuration; and a deployed configuration wherein the housing permits the flexible electronic display member to extend outside the housing for displaying the programmable message when the flexible electronic display member is in the deployed configuration.

5. The modular deployable display unit as claimed in claim 4, wherein the housing has an elongate configuration and has a pair of opposite ends and a longitudinal axis extending between the ends.

6. The modular deployable display unit as claimed in claim 5, wherein the housing comprises a shell defining a hollow internal chamber located within the shell.

7. The modular deployable display unit as claimed in claim 6, wherein the shell has an opening leading out of the shell.

8. The modular deployable display unit as claimed in claim 7, wherein the modular deployable display unit includes a spool having a pair of opposite ends and a longitudinal axis extending between the ends, the spool defining an axis of rotation about which the spool is rotatable, the flexible electronic display member being releasably coupled to the spool, the spool being displaceable between: a wound configuration wherein the flexible electronic display member is wound onto the spool for displacing the flexible electronic display member into the stowed configuration; and an unwound configuration wherein the flexible electronic display member is unwound from the spool for displacing the flexible electronic display member into the deployed configuration.

9. The modular deployable display unit as claimed in claim 8, wherein the spool is rotatably mounted within the internal chamber of the housing in an arrangement wherein the axis of rotation of the spool is parallel to the longitudinal axis of the housing.

10. The modular deployable display unit as claimed in claim 9, wherein the spool is rotatable mounted within the hollow internal chamber of the housing in an arrangement wherein the flexible electronic display member is located within the internal chamber of the housing when the flexible electronic display member is in the wound configuration.

11. The modular deployable display unit as claimed in claim 10, wherein, when the flexible electronic display member is in the unwound configuration, the flexible electronic display member at least partially extends from the opening in the shell.

12. The modular deployable display unit as claimed in claim 11, wherein the at least one connecting formation is also configured for releasably connecting the modular deployable display unit to a base support structure for supporting the display unit on a substrate surface.

13. The modular deployable display unit as claimed in claim 8, wherein the flexible electronic display member has a fixed end which is coupled to the spool and in use, allows the flexible electronic display member to be wound onto the spool when the spool rotates around its axis of rotation, the flexible electronic display member also having an opposite free end and mounting formations disposed at or near the free end thereof, for mounting the flexible electronic display member to a fixed support structure.

14. The modular deployable display unit as claimed in claim 1, wherein the at least one connecting formation comprises complementary connecting formations defined on the ends of the spool.

15. The modular deployable display unit as claimed in claim 1, further comprising an electrical connection between the modular deployable display unit and the additional modular deployable display unit.

16. The modular deployable display unit as claimed in claim 1, wherein the flexible electronic display member comprises a plurality of light emitting diodes (LEDs) for displaying the programmable message.

17. The modular deployable display unit as claimed in claim 1, wherein the flexible electronic display member includes one or more inflatable bodies which are inflated, in use, for displacing the flexible electronic display member into the deployed configuration.

18. The modular deployable display unit as claimed in claim 17, wherein the flexible electronic display member defines a plurality of apertures defined therethrough for permitting the passage of air through the plurality of apertures, in use.

19. The modular deployable display unit as claimed in claim 18, wherein the flexible electronic display member includes a plurality of flap members each associated with a particular one or more of the apertures and each arranged to cover the associated one or more of the apertures.

20. The display system comprising:
two or more modular deployable display units, each modular deployable display unit being a modular deployable display unit as claimed in claim 1.

* * * * *